(12) United States Patent
Iwao et al.

(10) Patent No.: US 8,817,616 B2
(45) Date of Patent: Aug. 26, 2014

(54) NODE DEVICE AND COMPUTER READABLE STORAGE MEDIUM STORING PROGRAM

(75) Inventors: Tadashige Iwao, Kawasaki (JP);
Kentaro Masubuchi, Kawasaki (JP);
Chiaki Nakajima, Kawasaki (JP);
Kentaro Ikemoto, Kawasaki (JP);
Syunsuke Koga, Fukuoka (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 12/908,169

(22) Filed: Oct. 20, 2010

(65) Prior Publication Data
US 2011/0141932 A1  Jun. 16, 2011

Related U.S. Application Data

(63) Continuation of application No. PCT/JP2009/001924, filed on Apr. 27, 2009.

(30) Foreign Application Priority Data

Apr. 25, 2008 (JP) ................................. 2008-115023

(51) Int. Cl.
*H04L 12/28* (2006.01)

(52) U.S. Cl.
USPC ........................................ 370/230.1; 370/401

(58) Field of Classification Search
USPC ................. 370/229–232, 235, 252, 400, 401, 370/463–465, 468
See application file for complete search history.

(56) References Cited

U.S. PATENT DOCUMENTS

| 7,327,683 | B2* | 2/2008 | Ogier et al. ................. 370/236 |
| 8,107,501 | B2* | 1/2012 | Savage et al. ............... 370/503 |
| 2003/0179742 | A1* | 9/2003 | Ogier et al. ................. 370/351 |
| 2005/0197127 | A1 | 9/2005 | Nakasaku et al. |
| 2007/0177511 | A1* | 8/2007 | Das et al. ..................... 370/238 |

(Continued)

FOREIGN PATENT DOCUMENTS

| CN | 101069387 A | 11/2007 |
| EP | 1 816 805 A1 | 8/2007 |

(Continued)

OTHER PUBLICATIONS

Australian Patent Examination Report No. 1 issued Aug. 31, 2012 in corresponding Australian Patent Application No. 2009239253.

(Continued)

*Primary Examiner* — Kerri Rose
(74) *Attorney, Agent, or Firm* — Staas & Halsey LLP

(57) ABSTRACT

In a node device 1 in a communication network, an FID management table 5 stores an FID for unique identification of a frame and the information about a destination node of the frame, and a weighting table 7 stores weighting information about another node as a destination for relay of the frame for each final destination node of the frame. When a frame transmitted to a local node is received, and if the FID of the received frame is stored in the FID management table 5, the data about the destination node associated with the FID is updated. If the FID of the frame received from the frame reception device is not stored in the FID management table 5, the FID management table 5 corresponding to the destination node of the frame is referred to, and another node as a destination for relay of the frame is determined.

14 Claims, 24 Drawing Sheets

(56) References Cited

U.S. PATENT DOCUMENTS

| | | | |
|---|---|---|---|
| 2007/0245034 A1* | 10/2007 | Retana et al. | 709/238 |
| 2008/0062862 A1* | 3/2008 | Goyal et al. | 370/218 |
| 2008/0125069 A1 | 5/2008 | Davis et al. | |
| 2008/0310433 A1* | 12/2008 | Retana et al. | 370/401 |
| 2009/0080347 A1 | 3/2009 | Ishii | |
| 2011/0044169 A1* | 2/2011 | Liu | 370/235 |

FOREIGN PATENT DOCUMENTS

| | | |
|---|---|---|
| JP | 2-109445 | 4/1990 |
| JP | 2002-171283 | 6/2002 |
| JP | 2002-271399 | 9/2002 |
| JP | 2003-273964 | 9/2003 |
| JP | 2005-236698 | 9/2005 |
| JP | 2005-252781 | 9/2005 |
| JP | 2005-260299 | 9/2005 |
| JP | 2005-323266 | 11/2005 |
| JP | 2006-526937 | 11/2006 |
| JP | 2006-340165 | 12/2006 |
| JP | 2007-19835 | 1/2007 |
| JP | 2007-209042 | 8/2007 |
| JP | 2007-535203 | 11/2007 |
| JP | 2008-501263 | 1/2008 |
| JP | 2008-85924 | 4/2008 |
| KR | 10-2007-0093983 | 9/2007 |
| WO | 2004/114690 A1 | 12/2004 |
| WO | 2005/010214 A2 | 2/2005 |
| WO | 2005-079025 A1 | 8/2005 |
| WO | 2005/119981 A1 | 12/2005 |
| WO | 2006/104185 A1 | 10/2006 |

OTHER PUBLICATIONS

Korean Office Action dated Dec. 22, 2011 issued in corresponding Korean Patent Application No. 10-2010-7023884.
Japanese Office Action issued Aug. 23, 2011 in corresponding Japanese Patent Application 2010-509093.
Tadashige Iwao et al., "Multipurpose Practical Sensor Network: S-wire", Fujitsu P.; May 2006; pp. 285-290.
International Search Report for PCT/JP2009/001924, mailed Jul. 14, 2009.
Extended European Search Report dated Jan. 4, 2013, issued in corresponding European Patent Application No. 09734953.4.
Chinese Office Action mailed Mar. 5, 2013 for corresponding Chinese Application No. 200980113894.2.
Office Action issued Apr. 12, 2013 in corresponding Canadian Patent Application No. 2,721,911.
Office Action mailed Oct. 29, 2013 in corresponding Japanese Application No. 2013-006543.
Office Action issued Oct. 3, 2013 in corresponding Australian Application No. 2009239253.
Office Action mailed Sep. 18, 2012 in corresponding Japanese Patent Application No. 2011-232231.
Office Action mailed Jul. 5, 2013 in corresponding Australian Patent Application No. 2009239253.
Canadian Office Action for Application No. 2,721,911 dated May 5, 2014.
Australian Office Action for Application No. 2009239253 dated Feb. 20, 2014.
Australian Office Action for Application No. 2013204999 dated Feb. 12, 2014.

* cited by examiner

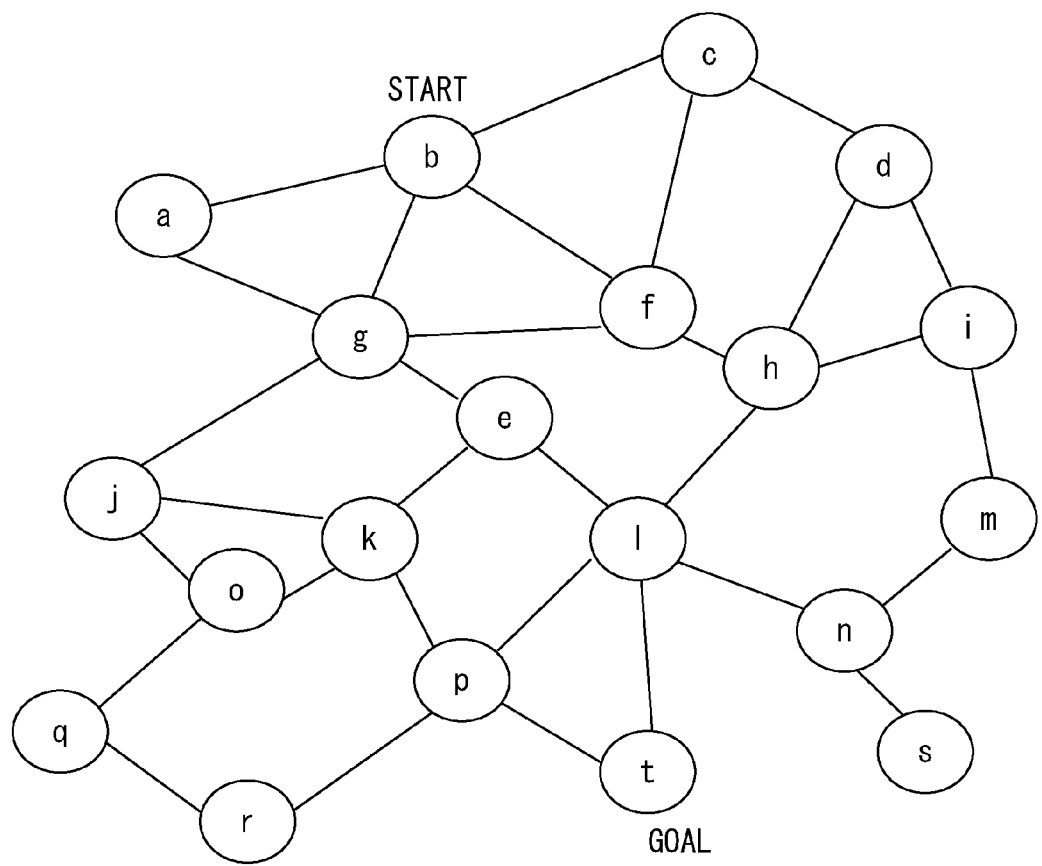
F I G. 1

| NODE ID | LATEST UPDATE TIME | LINK STRENGTH |
|---|---|---|
| $Node_1$ | $T_1$ | $L_1$ |
| $Node_2$ | $T_2$ | $L_2$ |
| ... | | |
| $Node_n$ | $T_n$ | $L_n$ |

F I G. 4

| LD | LS | GD | GS | FID | TYPE | DATA LEN | DATA |

F I G. 5

| FIELD NAME | DESCRIPTION |
|---|---|
| LD | SHORT FOR Local Destination. DESTINATION NODE ID OF ADJACENT NODE |
| LS | SHORT FOR Local Source. SOURCE NODE ID OF ADJACENT NODE |
| GD | SHORT FOR Global Destination. FINAL DESTINATION NODE ID |
| GS | SHORT FOR Global Source. ORIGINAL SOURCE NODE ID |
| FID | SHORT FOR Frame ID. UNIQUE NUMBER OF FRAME |
| TYPE | FRAME TYPE |
| DATA LEN | LENGTH OF DATA BODY |
| DATA | DATA BODY |

FIG. 6

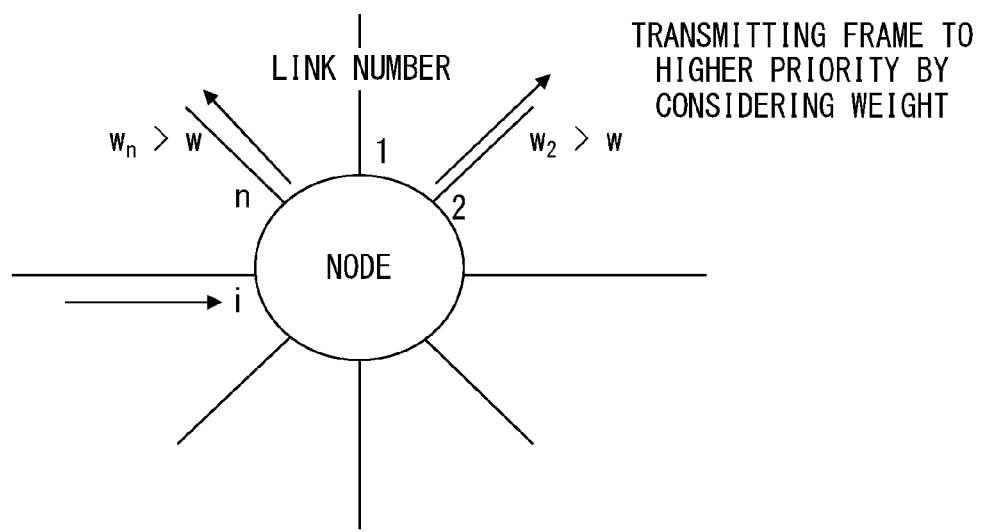
F I G. 7A

ADJACENT NODE MANAGEMENT TABLE

| LINK NUMBER | WEIGHT |
|---|---|
| 1 | $w_1$ (<w) |
| 2 | $w_2$ (>w) |
| ... | .. |
| i | $w_i$ (repalce to w) |
| ... | .. |
| n | $w_n$ (>w) |

F I G. 7 B

| FID + GS | LD | LS |
|---|---|---|
| $FID_1 + GS_1$ | $Node_1$ | $Node_i$ |
| ... | | |
| $FID_x + GS_x$ | $Node_y$ | $Node_x$ |

LIMITED FIFO (braces around the table)

F I G. 9

| ITEM NAME | HELLO HEADER | | | |
|---|---|---|---|---|
| | GLOBAL DESTINATION ADDRESS (GD) | HOP COUNT h | ROUTE QUALITY WEIGHT d | INCOMING ROUTE QUALITY WEIGHT | NODE TYPE |
| SIZE (byte) | 6 | 1 | 1 | 1 | 1 |

F I G. 1 2

| ITEM NAME | GLOBAL DESTINATION ADDRESS (GD) | LOCAL DESTINATION ADDRESS (LD) | HOP COUNT h | INTER-LINK REACH WEIGHT w | ROUTE QUALITY WEIGHT d | EVALUATION VALUE E | NODE TYPE |
|---|---|---|---|---|---|---|---|
| SIZE (byte) | 6 | 6 | 1 | 1 | 1 | 1 | 1 |

F I G. 1 5

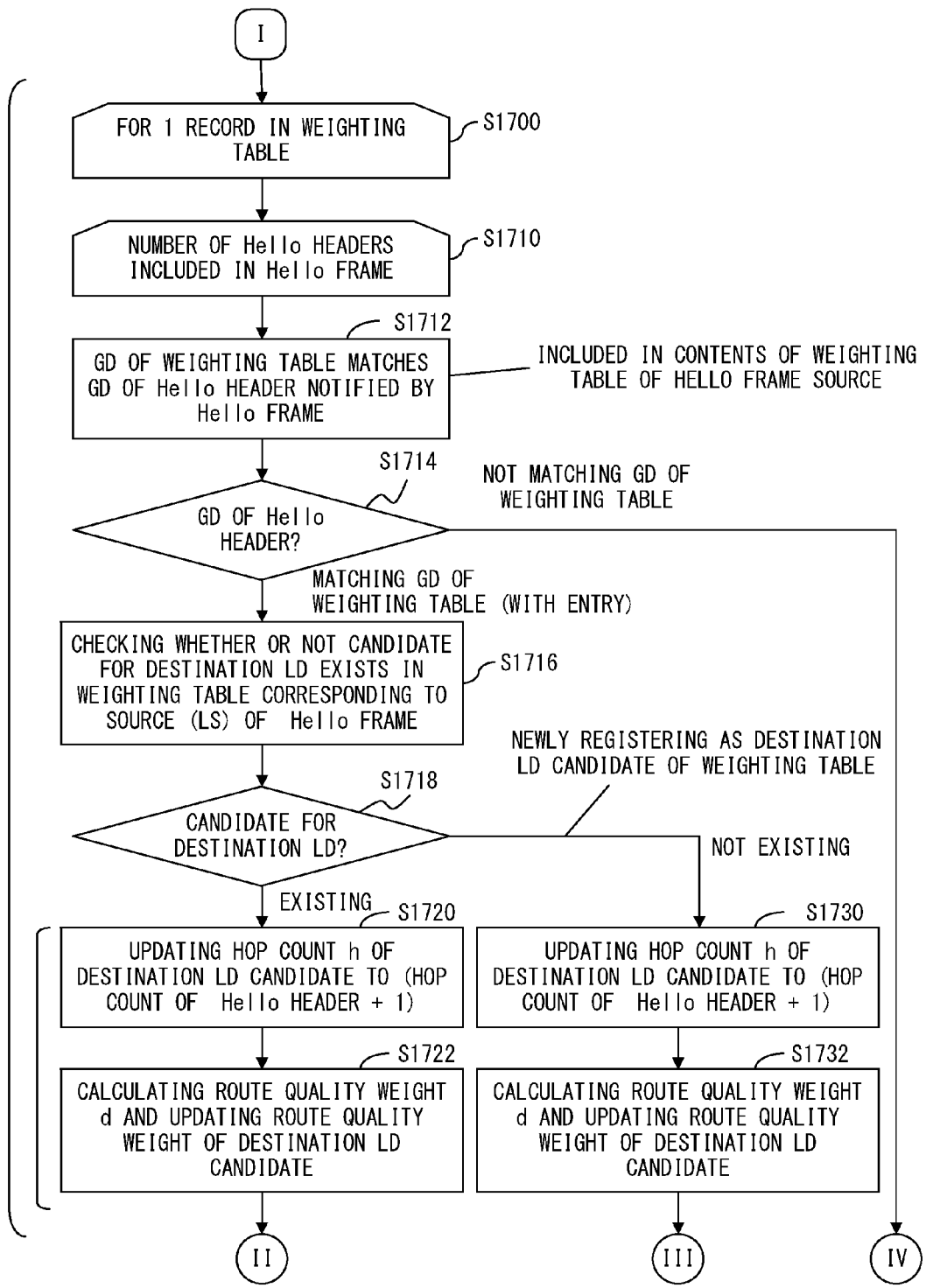
F I G. 1 7

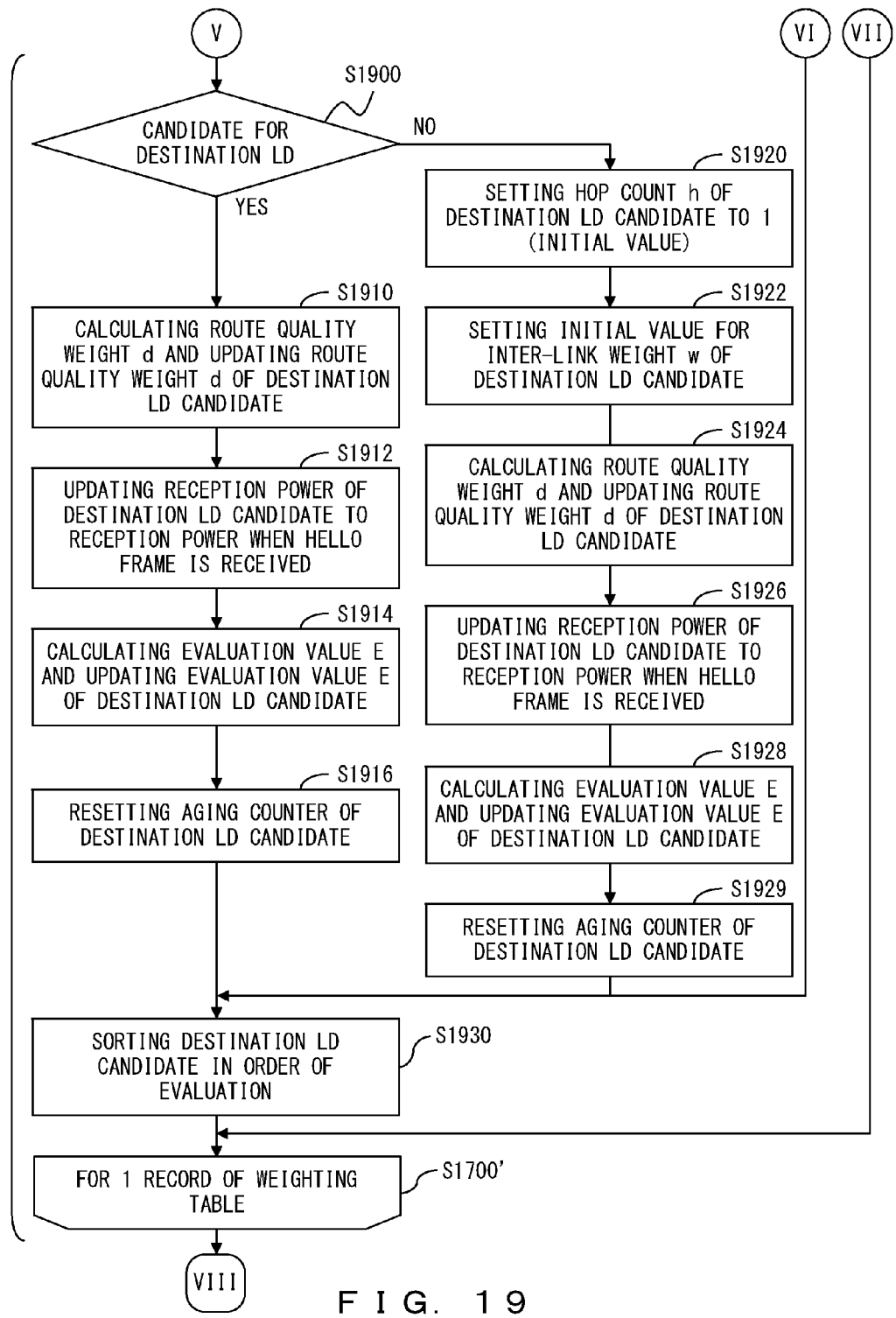
F I G. 19

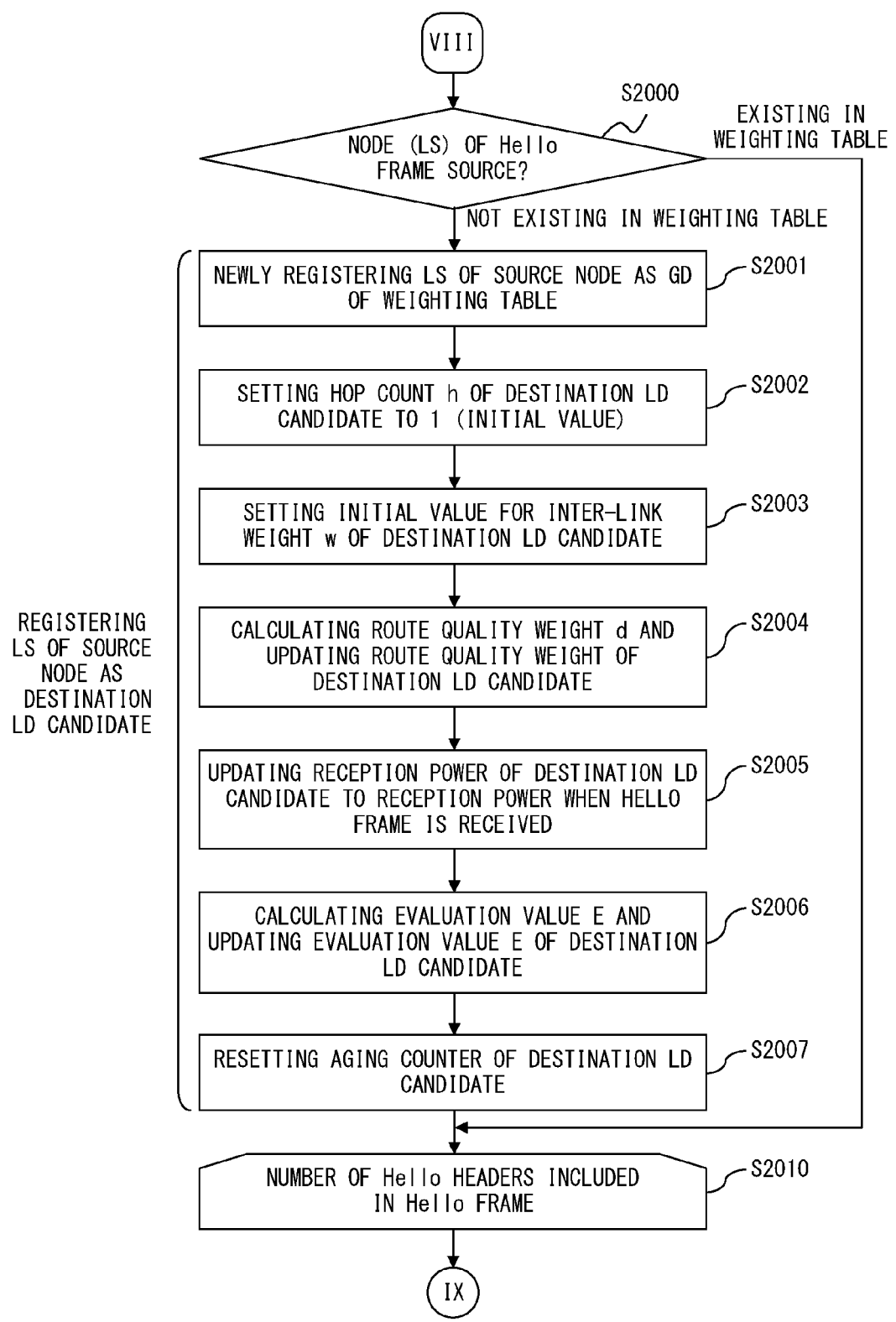
F I G. 2 0

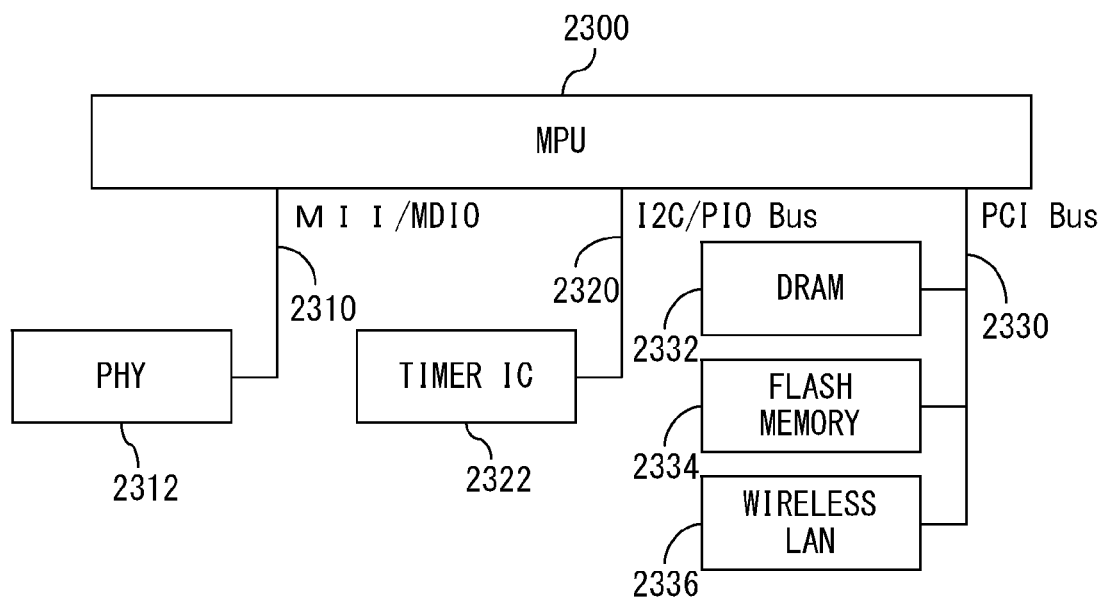
F I G. 2 3

NODE DEVICE AND COMPUTER READABLE STORAGE MEDIUM STORING PROGRAM

CROSS-REFERENCE TO RELATED APPLICATIONS

This application is a continuation application, under 35 U.S.C. §111(a), of international application PCT/JP2009/001924, filed on Apr. 27, 2009, which claimed priority to Japanese application No. 2008-115023, filed Apr. 25, 2008, the entire contents of which are incorporated herein by reference.

FIELD

The present invention relates to a device and a computer readable storage medium storing a program capable of selecting a route in a network including a plurality of nodes.

BACKGROUND

A number of studies have been made on a network device. The most widespread network device uses an IP (Internet protocol) network. An MPLS (multiprotocol labeled switching) is a network device having a mechanism of automatically generating a route. In addition, there are an AODV (Ad-hoc on-demand vector) and an OLSR (optimized link state routing).

In the IP network device, a route is determined according to an IP address. Since an IP address has a tree structure, a frame can be transmitted to a final target terminal by transmitting an upper part of IP address to a network device managing a matching IP network. A route is determined by an IP address system. Which network device manages which IP network is regulated by a routing table. The routing table is mainly set manually, but can also be automatically updated by a RIP (routing information protocol). An RIP is a system for broadcasting an IP network managed by a network device to the surroundings, and confirming the IP network managed by each network device.

In the MPLS, networks are separated into network devices called LSRs (label switch routers) and external networks. A frame from an external network is taken into an internal network by a network device spanning an external network called an edge node and an internal network. In this case, a label is inserted into the head of the external frame. Each LSR has a label transfer table. The label transfer table holds a label of an input frame, a label of an output frame, and a destination. The LSR retrieves a label of an input frame, finds a corresponding label from the label transfer table, rewrites the label into the label of the output frame, and transmits it to a corresponding destination. It is performed by the LDP (label distribution protocol) of the label transfer table. The LDP first generates a routing table by the RIP etc., adds a label to the table, and transmits a notification between the adjacent nodes.

The AODV is a method of finding a route to a target node device after another node communication node device repeats a broadcast using the broadcast in searching for a route. The communication node device transmits a frame called a "route request (RREQ)" to the surroundings to find a target route. The frame describes a target communication node ID to be retrieved. When a surrounding communication node device is not retrieved by itself, it newly generates a RREQ frame, and repeatedly performs a broadcast to the surroundings. In this case, each communication node device records from which adjacent communication node device the received message is transmitted. When the RREQ frame reaches a target communication node device, the target communication node device generates a "route reply (RREP)" frame, and transmits the RREP frame to a source node so that the route of the transmitted RREQ frame can be traced. Thus, a bidirectional communication route is generated.

In the OLSR (optimized link state routing), the entire network is grasped by periodically exchanging a frame among the communication node devices and detecting a route to a target communication node. A communication node device periodically transmits a hello frame to notify each other of the existence. When the existence of a communication node device as a communication partner is known, a route for flooding in efficiently distributing a frame to the entire network is generated next. It is called "MPR (multipoint relay)". By the MPR, a frame can be efficiently broadcast from each communication node device to the entire network. Next, using the MPR, all node devices can be informed of the network topology by mutually distributing a TC (topology control) frame as a route generating message to one another. When a frame is to be transmitted to a target communication node device, a network topology known to the source communication node device is referred to, and the frame is committed to an adjacent destination communication node device. The adjacent node device performs a similar process, and finally transmits the frame to the target node device.

In an Ad-hoc wireless communication network, as a well-known technique, each node broadcasts the information as a hello message including the information about the existence of the local node and the route metric to the local node. Another node which receives the hello message adds to the received route metric the route metric for the route between the node which has broadcast the hello message and the local node. The resultant route metric is used in the technique (for example, the patent document 1). The route metric in this case can be a value indicating the costs at the source and the destination calculated by a factor such as a hop count, link quality, etc.

Patent Document 1: National Publication of International Patent Application No. 2006-526937

SUMMARY

The IP network device and the MPLS are based on that a network itself has a structure using addresses. Since IP addresses configure a tree structure, a route is determined by selecting the direction in which an address matching process is performed in order from the highest order. The process is based on the connection by cable. Since the connection by cable permits stable communications between two communication terminals, that is, no frame can be received by communication equipment which is not connection by cable, the route can be determined simply by the hop count of communication units.

However, when the wireless communication is performed, the system described above has difficulty in generating a route with high communication quality. In the wireless communication, the communication quality is lower than in the cable communication, and other communication terminals which have no direct relationships in communications are also affected. The communication quality also largely depends on the distance, the ambient environment, and a change with time. When the above-mentioned protocol is used under the circumstances, an algorithm can use a route passing through a distant communication terminal if the route is determined based only on the hop count. However, if the distance is long, the communication quality is low, and a selected route is very low in quality.

The AODV places a load on a network when a route is generated. Although there occurs no problem when the number of communication terminals is small, the load on the network becomes heavy when the number of communication terminals increases and the traffic is heavy. As a result, the communication node device whose communications have already been established is affected, and there is the possibility of a short link. Thus, there are only a very small number of node devices capable of establishing a communication, and most devices cannot establish a route. In addition, since the system is based on the hop count as described above, a generated route can have very low communication quality.

It is necessary in the OLSR that all node devices have to know the network topology. Therefore, there is a limited scale. Furthermore, the time is required to know the topology of all node devices.

As described above, regardless of cable or wireless communication, the communication quality can depends of the communication quality between node devices by the traffic condition and the ambient environment. Especially the wireless communication has a large influence. Therefore, if a network includes a very large number of node devices, it is not practical to have a server for managing the network, and allow the network to be managed by the server because since the number of node devices is large, a large load is imposed only by transmitting a control instruction from a server. Therefore, when a network is configured by a very large number of node devices, it is desired that each node device autonomously selects a route and monitors the active/inactive state.

Assuming that each node device autonomously operates, the communication quality changes as described above. Therefore, when a transmission frame addressed to anode device is relayed, it is necessary for each node device to grasp a currently valid route. For example, in a network having a fixed structure and a common searching method using a binary tree, the entire image of the network or the tree is known at the initial stage. Therefore, it is easily determined how far the route has been searched. On the other hand, in the network according to the present application in which a link between node devices changes, each node device does not know what node device is linked beyond the surrounding node devices, thereby requiring a system for finding how far the route has been searched.

The present invention provides a node device and a computer readable storage medium storing a program capable of autonomously selecting an appropriate route using a simple structure without imposing a load on a network.

The node device according to an embodiment of the present invention in a network having a plurality of node devices includes: an identification information management table for storing, as the information about a frame transmitted by a local node, identification information for unique identification of a frame and the information about a destination node of the frame; a destination node weighting table for storing weighting information about another node as a destination for relay of the frame for each final destination node of the frame; a frame reception device for receiving the frame transmitted addressed to the local node from another node; a destination node weighting table update device for updating data of the destination node weighting table corresponding to the final destination of the frame for the destination node stored as associated with identification information when the identification information about the frame received by the frame reception device is stored in the identification information management table; and a frame destination determination device for determining another node as a destination for relay of the frame by referring to the destination node weighting table corresponding to a final destination node of the frame when the identification information about the frame received by the frame reception device is not stored in the identification information management table.

When a frame is received from another node, a destination node weighting table is referred to and a node to which the frame is transferred is determined. The node to which the frame is transferred is determined according to the weight, and the weight is updated according to the possibility of the transfer of the frame to another node. The node device can autonomously learn a route.

When the identification information about the frame received by the frame reception device is stored in the identification information management table, the adjacent node management table update device can update the weight of the destination node of the destination node weighting table corresponding to the final destination of the frame so that the priority can be reduced for the destination node stored as associated with the identification information.

Furthermore, the node device can further includes: an adjacent node management table for storing the information about another node existing around the local node; a hello message transmission device for transmitting as a hello message the information about the existence of the local node and the information about the ambient route read from the adjacent node management table; a hello message reception device for receiving the hello message transmitted from another node; and an adjacent node management table update device for updating the adjacent node management table according to the information about a source node of the hello message received by the hello message reception device. When a first node reaching a predetermined state is detected in the adjacent node management table, the destination node weighting table update device can update the destination node of the destination node weighting table so that the priority of the data of the first node can be reduced.

According to the node device of the embodiments of the present invention, each node device determines the node to which a frame is transferred by referring to the held information about the weight, and updates the information about the weight in the network in which a link between node devices changes. Thus, the device can autonomously learn the optimum route and establish a communication without grasping the entire network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates the entire concept of a communication system;

FIG. 4 illustrates the structure of the adjacent node management table;

FIG. 5 is an example of the format of a frame;

FIG. 6 is an explanatory view of an example of the format of the frame in FIG. 5;

FIGS. 7A and 7B are explanatory views of the data transfer process according to the adjacent node management table;

FIG. 9 is an example of an FID management table;

FIG. 12 illustrates the format of the hello header;

FIG. 15 is a detailed explanatory view of the structure of the weighting table;

FIG. 17 is a detailed flowchart (2) of the process of receiving a frame of the node device according to an embodiment of the present invention;

FIG. 19 is a detailed flowchart (4) of the process of receiving a frame of the node device according to an embodiment of the present invention;

FIG. 20 is a detailed flowchart (5) of the process of receiving a frame of the node device according to an embodiment of the present invention;

FIG. 23 illustrates the outline of the node device or the hardware capable of executing a program according to an embodiment of the present invention.

DESCRIPTION OF EMBODIMENTS

Figure 2:
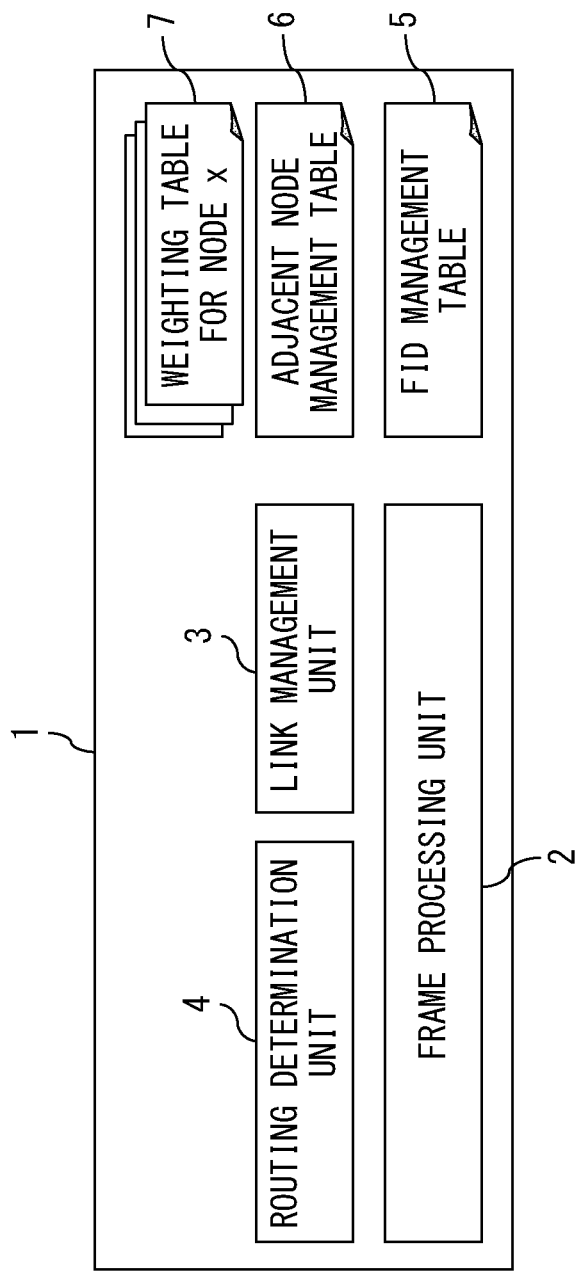
FIG. 2 illustrates the outline of the node device according to an embodiment of the present invention.

The preferable embodiments of the present invention are described below in detail with reference to the attached drawings.

First, the terms used in the present specification are described below.

A "frame" refers to a data unit processed by the protocol. The "frame" includes, for example, a "hello frame" and a "data frame", but is not limited to them.

A "hello frame" refers to a special frame transmitted by a node device according to an embodiment of the present invention for conformation of the existence and the state between the device and another node device.

A "data frame" refers to data to be transmitted by a network from a start node to a goal node. It is obvious that the node device according to an embodiment of the present invention can include an appropriate device for identifying a "hello frame" from a "data frame".

A "local destination (LD)" refers to a destination node ID indicating an adjacent node device to which a frame is to be transferred when a node device is viewed as a subject. In the present specification, an LD can also be referred to as a "local destination address".

A "local source (LS)" refers to a node ID indicating a node device as a direct source which transmit a frame to an LD (that is, a local node device for the LD). In the present specification, an LS can also be referred to as a "local source address".

A "global destination (GD)" refers to a node ID as a final des in a series of propagating operations spanning in the network of data frames. In the present specification, a GD can also be referred to as a "global destination address".

A "global source (GS)" refers to a node ID as the first source in a series of propagating operations in a network of data frames. In the present specification, a GS can also be referred to as a "global source address".

A "frame ID (FID)" refers to unique identification information about each frame. A FID can be, for example, a series of numbers, but is not limited to them.

A "weight" refers to a value considered when selecting a frame propagation route. A weight is exemplified in the present specification as an incoming route link weight, an outgoing route link weight, a bidirectional link weight, a route quality weight, an incoming route quality weight, and an inter-link reach weight, but is not limited to them. In describing the present specification, it is to be noted that a "weight" or "information about a weight" can refer to a value calculated using any type of weight.

An "incoming route link weight" refers to a weight of a frame in the incoming route. When a node device is considered as a subject, and if the node device receives a frame from another adjacent node device, it is assumed that the frame has passed through the "incoming route".

An "outgoing route link weight" refers to a weight of a frame in the outgoing route. When a node device is considered as a subject, and if the node device transmits a frame to another adjacent node device, it is assumed that the frame passes through the "outgoing route".

A "bidirectional link weight" refers to a weight calculated as a combination of the above-mentioned outgoing route link weight and incoming route link weight. In an embodiment of the present invention, the "incoming route link weight", the "outgoing route link weight", and the "bidirectional link weight" are data which can be included in the adjacent node management table described later in detail. However, in another embodiment, any other combinations can be included.

A "route quality weight" refers to a value indicating the delay in the route to the GD.

An "incoming route quality weight" refers to a value indicating the communication quality from the partner node device to the local node device.

An "inter-link reach weight" refers to a value indicating the possibility of the transfer of a frame between links. In an embodiment of the present invention, the "route quality weight", the "incoming route quality weight", and the "inter-link reach weight" are data which can be included in the weighting table described later in detail. However, in another embodiment, any other combinations can be included.

FIG. 1 illustrates the entire concept of a communication system. As illustrated in FIG. 1, the network includes node devices (a, b, . . . , s, t) connected to one another. In the present communication system, each node device operates as a relay unit when transmitting information from a start node (node device b in the example in FIG. 1) to a goal node (node device t in the example in FIG. 1).

Each node device holds unique identification information (ID, identification). An ID assigned to each node device is hereinafter referred to as a node ID. Each node device does not grasp the adjacent node devices or the entire network. In the initial state, there are no links and each node device does not grasp the existence or state of other node devices.

To transmit information from a start node {b} to a goal node {t} in the communication system illustrated in FIG. 1, it is necessary to first generate a network. The procedure of generating a network is described below.

First, ambient node devices are detected. A node device periodically notifies ambient node devices of the existence of itself. The notification to the ambient node devices is provided with the information relating to the generation of a route. Upon receipt of a notification, each node device generates a list of the ambient node devices to grasp the existence of the ambient node devices around the node.

The node device which has detected the ambient node devices determines a node device as a partner to which it is to transfer the information according to the generated list, and transfers the information to the node device.

When a node device determines another node device to which information is to be transferred, the node device does not know to which node device among a plurality of ambient node devices the information is to be committed to allow the information to reach a target goal node. Then, the node device according to the present embodiment generates a weighting table indicating to which node device among the ambient node devices the information is to be transferred on a priority basis, and determines a node device to which the information is to be transferred according to the information about the weight stored in the weighting table.

The node device according to the present embodiment is described below practically.

FIG. 2 illustrates the outline of the node device according to an embodiment of the present invention. The outline of a node device 1 illustrated in FIG. 2 has a frame processing unit 2, a link management unit 3, a routing determination unit 4, a FID (frame ID) management table 5, an adjacent node management table 6, and a weighting table 7. Although not clearly illustrated in FIG. 2, any type of storage device (for example, DRAM, or flash memory) well known in the technical field can store the FID (frame ID) management table 5, the adjacent node management table 6, and the weighting table 7 as a data table.

The frame processing unit 2 performs the process of a data frame exchanged between the unit and the node device adjacent to the node device 1. Upon receipt of a data frame, the frame processing unit 2 accesses the storage device (not illustrated in FIG. 2), and detects an occurrence of a loop using the FID management table 5 (corresponding to the identification information management table.

The link management unit 3 accesses the storage device (not illustrated in FIG. 2), and manages the active/inactive state and the link strength of adjacent node devices using the adjacent node management table 6.

The routing determination unit 4 accesses a storage device (not illustrated in FIG. 2), refers to the weighting table 7 (corresponding to the destination node weighting table described in the claims), and determines to which adjacent node device the frame is to be next transferred. The weighting table 7 is generated for each of the final destinations (that is, the global destination (GD)).

Each of the plurality of node devices forming the network in FIG. 1 has a structure as illustrated in FIG. 2, but in the following descriptions, it is discriminated from other node devices, and assigned a reference numeral "1" or "1a". Each node device can be connected by wireless or by cable. If requested, it can be assumed in an embodiment of the present invention that a device or a program according to the embodiment of the present invention can be applied to the network in which wireless and cable systems can coexist.

Figure 3:
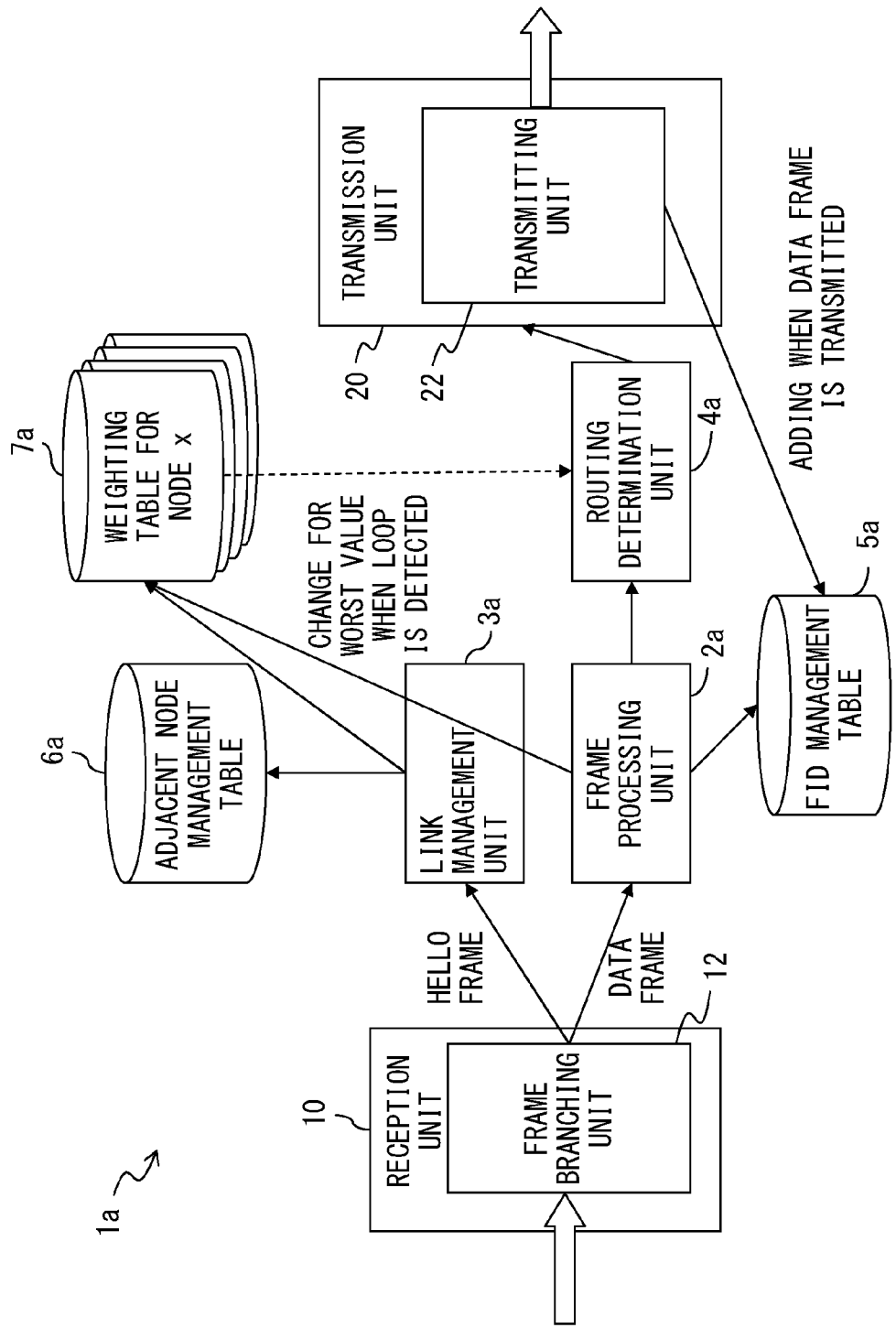
FIG. 3 illustrates the detailed schematic diagram of the node device according to an embodiment of the present invention.

FIG. 3 illustrates the detailed schematic diagram of the node device according to an embodiment of the present invention. It is to be noted that the prefix "a" assigned to a reference numeral is equal to the element having the same number or refers to a similar element. In the present specification, for example, a device XXX and a device XXXa are both included in the embodiment of the present invention. In addition, the suffix of a reference numeral can be omitted and refers to a concept including the elements having and not having the suffix. For example, when a device XXX is expressed, it also includes a device XXXa as far as no contradiction occurs.

A node device 1a in FIG. 3 includes a frame processing unit 2a, a link management unit 3a, a routing determination unit 4a, a FID management table 5a, an adjacent node management table 6a, a weighting table 7a, a reception unit 10, and a transmission unit 20. The FID management table 5a, the adjacent node management table 6a, and the weighting table 7a can be stored in any appropriate storage device. The storage device can be stored in the node device 1a, or provided outside the node device 1a. A single storage device or a plurality of storage devices can be provided for each node device.

When the node device 1a corresponding to the above-mentioned LS receives a frame (including a data frame and a hello frame) by the reception unit 10, a frame branching unit 12 identifies the type of the frame, and branches the process depending on the type. The details are described later, but the frame branching unit 12 can use an identifier for expressing the type of and assigned to the frame.

When the received frame is a hello frame, the frame branching unit 12 passes the frame to the link management unit 3a. The link management unit 3a accesses the storage device storing the adjacent node management table 6a, and manages the active/inactive state and the link strength of adjacent node devices. Then, the link management unit 3a accesses the storage device storing the weighting table 7a when a loop is detected, and registers or updates the information about the weight (described later in detail).

When the received frame is a data frame, the frame branching unit 12 passes the frame to the frame processing unit 2a. The frame processing unit 2a accesses the storage device storing the FID management table 5a, and manages the information about the FID, the LD, and the GS. Then, the frame processing unit 2a passes the frame to the routing determination unit 4a. When a loop is detected, the frame processing unit 2a accesses the storage device storing the weighting table 7a, and registers or updates the information about the weight (described later in detail).

The routing determination unit 4a accesses the storage device storing the weighting table 7a, acquires the information about the weight, and determines to which node device the frame is to be transmitted. Then, it passes the frame to the transmission unit 20.

When the transmission unit 20 transmits the frame received from the routing determination unit 4a to another node device, it allows a transmitting unit 22 to access the storage device storing the FID management table 5a, and registers and updates the information about the FID, the LD, and the GS.

In the embodiment of the present embodiment, as described above, a table such as the adjacent node device management table, the FID (frame ID) the management table, the weighting table, etc. is used. First, the adjacent node management table is described.

FIG. 4 illustrates the structure of the adjacent node management table 6 or 6a. The adjacent node management table 6 or 6a includes the node ID, the latest update time, and the link strength.

The node ID is identification information assigned to each node device for identification of the node device forming a network.

The latest update time is date and time information at which the information was updated latest for the node device indicated by each node ID. Practically, for example, the date and time information at which the link strength was updated as the latest update time.

The link strength is calculated based on the link strength included in the hello frame received by the node device 1 or 1a from the adjacent node device, and stored in an appropriate storage device. The link strength can be calculated using, for example, the radio wave strength and the frame reach rate. The link strength corresponds to, for example, a bidirectional link weight.

As described above, to first configure a network in advance, a notification frame (hello frame) is exchanged between adjacent nodes. Then, the adjacent node management table 6 illustrated in FIG. 2 or the adjacent node management table 6a illustrated in adjacent node management table 6a, and the weighting table 7 illustrated in FIG. 2, or the weighting table 7a illustrated in FIG. 3 are generated in each node device. As described with reference to FIG. 1, it is not necessary to grasp the network topology in the node device 1 according to the present embodiment.

If the adjacent node management table 6 or 6a is generated, a node device to which a frame is to be transferred is determined among the adjacent nodes storing the information corresponding to the adjacent node management table 6 or 6a. The weighting table 7 referred to when a node device to which a frame is to be transferred is determined is updated in the process after the frame is received from an adjacent node device.

Figure 5:
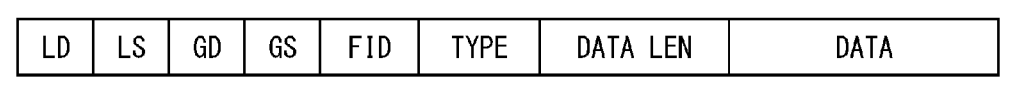

FIGS. 5 and 6 are examples of the formats of frames. The frame illustrated in FIG. 5 includes a node ID of the destination node (local destination) of an adjacent node, a node ID (LS) about the source node (local source) of an adjacent node, a node ID (GD) of the destination node (global destination), a node ID (GS) of the source node (global source), a frame ID (FID), a frame type (TYPE), a data length (DATALEN), and a data body (DATA).

The LD stores the node ID of the destination node to which a frame is to be transferred in the adjacent nodes of the node device 1.

The LS stores the node ID of the source node device to which a frame is to be transferred to an adjacent node device as the LD. For example, if the LD refers to the node ID of one of the node devices adjacent to the node device 1, then the LS is the node ID of the node device 1.

The GD stores the node ID of the final destination of a frame, and the GS stores the node ID of the originating source of the frame.

The frame ID stores the identification information for identification of the frame.

The frame type stores the information about the type of the frame. The type of the frame is, for example, a data frame, a hello frame, etc., but is not limited to them.

The data length stores the length of data body (data length, or also referred to as a frame size).

The data body stores the data to be propagated in a network.

It is to be noted that the formats described here in the present specification are examples only. According to another embodiment of the present invention, different formats can be used, and the other embodiment can be within the scope of the present invention.

FIGS. 7A and 7B are explanatory views of the data transfer process according to the adjacent node management table 6 or 6a of an embodiment of the present invention. FIG. 7A illustrates the outline of the weight for each adjacent node device. FIG. 7B is a simple example of the adjacent node management table 6 or 6a.

When a frame is received from one of the adjacent node devices, the node 1 or 1a according to the embodiment transfers the frame to a node device having a higher priority according to the information about the weight in the node devices other than the source of the frame, that is, the node device as the LS. The node device 1 or 1a assigns a link number to each of the adjacent node devices, thereby identifying each adjacent node device.

In the embodiment, the value used as the information about weight (for example, a bidirectional link weight etc.) is set within a range equal to or larger than 0 and equal to or smaller than 1. The smaller the value is, the higher the priority becomes. For example, 0.5 is set as an information initial value about the weight so that the value is changed depending on the possibility of the subsequent frame transfer and the presence/absence of the detection of a loop.

The setting and update of the information about weight are performed by a weight operation function (for example, a function with the link strength taken into account) described later. Since the weight operation function affects the behavior of the entire network, it is necessary to change it depending on the use of the network.

FIG. 7A illustrates the method of determining a node device to which a frame is to be transferred according to the information about weight when the frame is received from the adjacent node device having the link number i.

Upon receipt of the frame transferred from the adjacent node device having the link number i, the node device 1 or 1a refers to the weighting table corresponding to the node device of the GD in the adjacent node management tables 6 and 6a. Then, the received frame is to be transferred to the adjacent node device having the highest priority based on the information about weight and having the link number other than "i".

As illustrated in FIG. 7B, the adjacent node management table 6 or 6a stores the link number assigned to each adjacent node device and the weight of the adjacent node device associated with the link number. The link number can be substituted by a node ID. The node device 1 or 1a updates the adjacent node management table 6 or 6a according to the frame received from the adjacent node device of the link number i, and operates the information about the weight.

Figure 8:
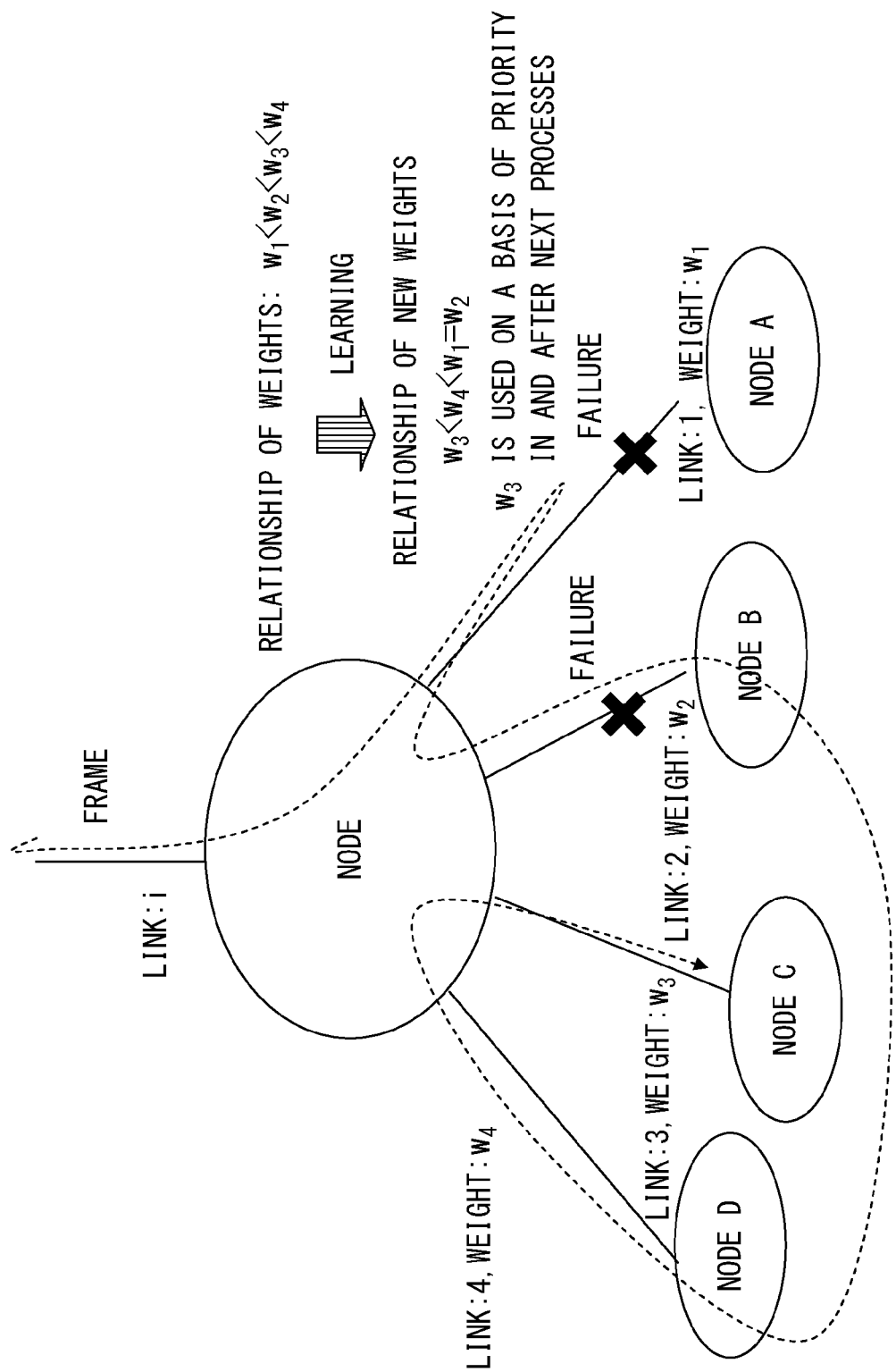
FIG. 8 is an explanatory view of the process of operating the information about the weight based on the result of transferring a frame.

FIG. 8 is an explanatory view of the process of operating the information about the weight based on the result of transferring data.

In the example in FIG. 8, the link numbers 1, 2, 3, and 4, and the weights $w_1$, $w_2$, $w_3$, and $w_4$ are set respectively to the adjacent node devices A, B, C, and D as the information about the weight.

When the communication between, for example, node devices is performed by wireless, the environment during the communication, the distance between the node devices, etc. can affect the communication quality. When the communication between the node devices is performed by cable, for example, the traffic can affect the communication quality. Considering the affection, the initial value of the weight is set to 0.5 in this example, and the range of the value is set to a value equal to or larger than 0 and equal to or smaller than 1. However, they are only examples, and other values can be used for weight in an embodiment. In this embodiment, the smaller the weight (close to 0), the higher the priority. However, it is also an example. There can be an embodiment in which a priority can be assigned in other methods (for example, the larger the weight, the higher the priority).

the weighting table can store the information about an adjacent node device to which a frame is to be transferred on a priority basis when the frame is transferred, and the information about other node devices. For example, a flag etc. can be prepared, and a value is set in a weighting table depending on the possibility of the transfer of the frame.

The node device 1 or 1*a* operates the information about the weight (for example, a bidirectional link weight) depending on the result of transferring the frame to an adjacent node device. First, the relationships among the weight values can be represented by $w_1<w_2<w_3<w_4$. That is, it is assumed that the priority of the adjacent node device A is the highest, and the priority of the adjacent node device D is the lowest.

In this case, when the node device 1 or 1*a* receives a frame from the adjacent node device i other than the adjacent node devices A through D, the node device 1 or 1*a* tries to transfer the frame in order from the adjacent node device A having the highest priority. If the data transfer to the adjacent node device A fails, the data is transferred to the node device B having the second highest priority.

Finally, if the data transfer fails for the adjacent node devices A and B, but the data is successfully transferred for the adjacent node device C, the node device 1 or 1*a* assigns the largest weight (worst value) and the lowest priority to the adjacent node devices A and B, thereby reducing the weight and assigning the highest priority to the adjacent node device C.

In the next and subsequent data frame transfer, the transfer destination (LD) of the frame is determined based on the relationship the weight ($w_3<w_4<w_a=w_2$) updated as described above, and the transfer of the frame is attempted starting with the adjacent node device C having the highest priority.

Described next is the method of detecting an occurrence of a loop.

FIG. 9 is an example of a configuration of the FID management table 5 or 5*a*. In the embodiment illustrated in FIG. 9, the FID management table 5 or 5*a* is, for example, a FIFO (first in first out) buffer. The FID management table 5 or 5*a* includes a frame ID (FID), a node ID of a source node GS, a node ID of a transfer destination node LD, and a node ID of a source node LS. The definition of a node ID of the FID, GS/LD/LS is similar with the corresponding field in each data frame illustrated in FIG. 6.

Upon receipt of a frame from an adjacent node device, the node device 1 or 1*a* compares the values of the fields of the FID and GS of the frame with the record stored in the FID management table 5 or 5*a*. As a result of the comparison, if the FID management table 5 stores a record having the same FID and GS as the received frame, the node device 1 or 1*a* determines that the frame is the same frame as the frame once received previously, and assumes that "a loop has occurred" or "a back-track has occurred by the interrupt in the process of the route". If an occurrence of a loop or a back-track is detected, the weighting table 7 or 7*a* is updated, and the worst value (the maximum value in this embodiment) is assigned to the information about the weight corresponding to the node ID of the LS of the frame.

On the other hand, if there is no record having the same FID and GS, then the node device 1 or 1*a* retrieves a value from each field of the FID, GS, LD, and LS in the received frame, and registers one record in the FID management table 5.

Described below in more detail is the process performed when a node device receives a data frame.

Figure 10:
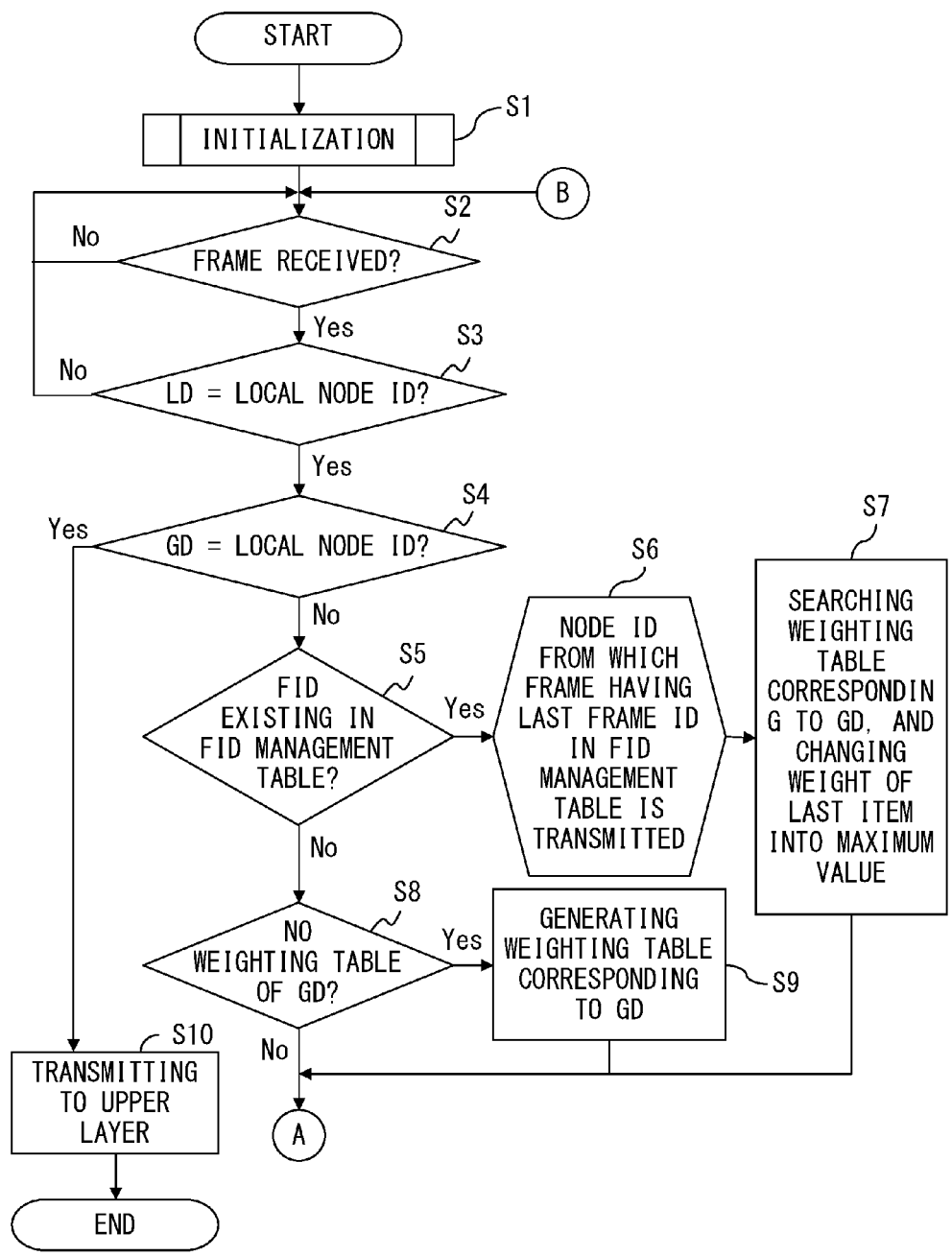
FIG. 10 illustrates the outline (1) of the flowchart of the process of receiving a data frame of the node device according to an embodiment of the present invention.
Figure 11:
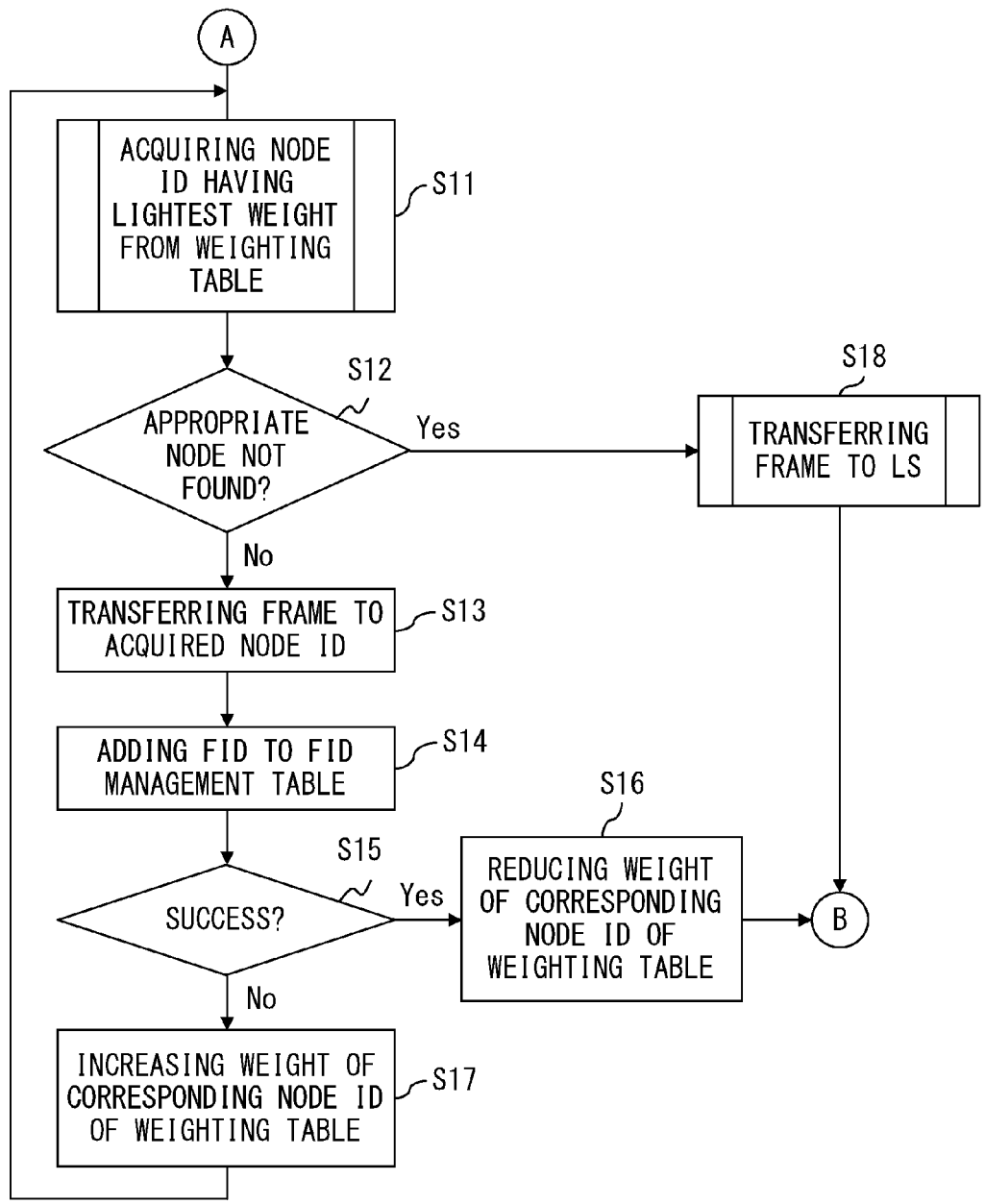
FIG. 11 illustrates the outline (2) of the flowchart of the process of receiving a data frame of the node device according to an embodiment of the present invention.

FIGS. 10 and 11 are the flowcharts of the process of receiving a data frame of the node device 1 or 1*a* according to an embodiment of the present invention.

In step S1, the initializing process is performed. In the initializing process in step S1, for example, when a communication is established with an adjacent node device by wireless, an available frequency is adjusted, and a modulation system is determined. The initializing process in step S1 is performed only when the node device 1 or 1*a* is provided in a network.

In step S2, the reception of a data frame is awaited. If a data frame is received in step S2, control is passed to step S3, and it is determined whether or not the node ID stored in the field of the LD is the node ID of the local node. If the LD stores the node ID of a device other than the local node, control is returned to step S2, and the waiting state is maintained.

Although a network configuring process is performed using a hello frame as described above between the processes in steps S1 and S2, the communication of the hello frame is performed in a thread different from that in the processes in FIGS. 10 and 11. Therefore, the description is omitted here.

If it is determined in step S3 that the field of the LD stores the node ID of the local device, control is passed to step S4.

In step S4, it is determined whether or not the node ID stored in the field of the GD is the node ID of the local device. If it is determined in step S4 that the node ID of the local device is stored in the field of the GD, and then it means that the final destination of the propagation of a series of data over the network is the local node device. Therefore, control is passed to step S10, the received data frame is processed (in a higher order hierarchical level), and the series of processes is terminated.

If it is determined in step S4 that the node ID stored in the field of the GD is the node ID of the device other than the local device, control is passed to step S5. It is determined in step S5 whether or not there is a record having a combination of the FID and the GS respectively matching the FID and the GS of the received data frame.

If it is determined in step S5 that the FID management table 5 includes a record matching the FID and the GS of the data frame, control is passed to step S6. In step S6, the LD is retrieved from the record for which it is determined that the FID and the GS respectively match the FID and the GS of the data frame. In step S7, for the weighting table 7 or 7*a* corresponding to the GD of the data frame, the record having the node ID matching the LD retrieved in step S6 is updated. For example, in the present embodiment, the node ID which last transmits the frame having the FID in the FID management table as an item Last is set. A change is made such that the information about the weight corresponding to the item Last can have the worst value (for example, 1.0) with the lowest priority. If the weighting table 7 or 7*a* is updated, control is passed to (A) in FIG. 11.

On the other hand, in step 5, if it is determined that there is no matching FID and GS in the FID management table 5, control is passed to step S8. It is determined in step S8 whether or not there is the weighting table 7 or 7*a* corresponding to the GD of the data frame.

If it is determined in step S8 that there is no weighting table 7 or 7*a* with respect to the node device indicated by the GD of the data frame, control is passed to step S9. Then, in step S9, the weighting table 7 or 7*a* is generated for the GD of the data frame, and control is passed to (A) in FIG. 11.

In other embodiments, in step S9, a weighting table can be generated with reference to, for example, the link strength of the adjacent node management table 6 or 6a illustrated in FIG. 5.

If it is determined that there is the weighting table 7 or 7a for the node device indicated by the GD of the data frame in step S8, no process is performed, and control is passed to step (A) in FIG. 11.

In the process illustrated in FIG. 11, control is first passed from (A) to step S11, and a node ID corresponding to an evaluation value having the highest priority is acquired from the weighting table 7 or 7a. Then, in step S12, it is determined whether or not an appropriate node device corresponding to the acquired node ID can be detected.

If it is determined in step S12 that an appropriate node device has been detected, control is passed to step S13, and the data frame is transferred to the node ID acquired in step S11.

Then, in step S14, the FID, GS, LD, and LS are added to the FID management table 5 based on the data included in the transferred data frame.

Then, in step S15, it is determined according to the backtrack from the transfer destination node device whether or not the transfer of the data frame has been successfully performed. For example, when an ack signal is received from the transfer destination node device, it is determined that the transfer has been successfully performed. If no ack signal is received after the lapse of a predetermined time, it is determined that the transfer has failed. If it is determined that the transfer has been successfully performed, the priority is enhanced by operating the evaluation value corresponding to the node ID of the transfer destination node device for the weighting table 7 or 7a of the node device indicated by the GD of the data frame in step S16, and control is returned to (B) in FIG. 10.

On the other hand, if it is determined in step S15 that the transfer of the data frame has failed, then the priority is reduced by operating the evaluation value corresponding to the node ID of the transfer destination node device in step S17, and control is returned to step S11.

Afterwards, the processes in and after step S11 are repeated until the transfer of a data frame is successfully performed or no appropriate node ID can be detected in the weighting table.

If it is determined in step S12 that no appropriate node device (node ID) can be detected from the weighting table 7 or 7a, control is passed to step S18, the received data frame is transferred to the node device indicated by the LS, and control is returned to (B) in FIG. 10.

As described above, when a data frame is transferred, the node device 1 or 1a according to the present embodiment refers to the weighting table 7 or 7a, determines a node device to which data is to be transferred on a priority basis, and updates the information about the weight (for example, an evaluation value) depending on the possibility of the data transfer. By determining a node device to which a frame is to be transferred on a priority basis according to the information about the weight, the return of a data frame upon occurrence of a loop and the return of a data frame when the route through which communications have been established is interrupted by the change of the state of a network are detected, based on which the route is bypassed and the communications can be continued through the optimum route. As described above, the weighting table 7 or 7a is generated for each GD, but it is to be noted that, in the present embodiment, only one weighting table is considered as an example for comprehensibility.

In the communication system illustrated in FIG. 1, each node device monitors the state of a network. The method of monitoring a network by the node device according to the present embodiment is described below.

As described above, each node device includes in a hello frame and transmits the information about the communication quality of the radio wave received from another node device. The node device refers to the hello frame received from another node device, calculate the communication quality of the adjacent node device, and holds the information about the calculated communication quality in the adjacent node management table 6 or 6a. In an embodiment, the communication quality is determined by the delay and the hop count.

FIG. 12 illustrates the format of the hello header stored in a predetermined area in the hello frame. As illustrated in FIG. 12, the hello header includes a global destination address (that is, GD), a hop count h, a route quality weight d, an incoming route quality weight, and a node type.

The global destination address (GD) is the information about, for example, the global destination address (GD) corresponding to the weighting table 7 held by the node device as the first source (GS) of the hello frame including the hello header illustrated in FIG. 12.

The hop count is, for example, the information about the hop count from the source of the hello frame to the node device as the final destination (GD).

The route quality weight d stores a value obtained from the delay on the route up to the GD.

The incoming route quality weight stores a value obtained based on the communication quality in the direction from a communication partner node device (in this example, the node device which has transmitted the hello frame) to the local node device.

As a node type, the type of a gateway, a repeater, a terminal, etc. are defined.

The method of obtaining the route quality weight d in the information stored in the hello header is described practically below with reference to FIG. 13.

Figure 13:
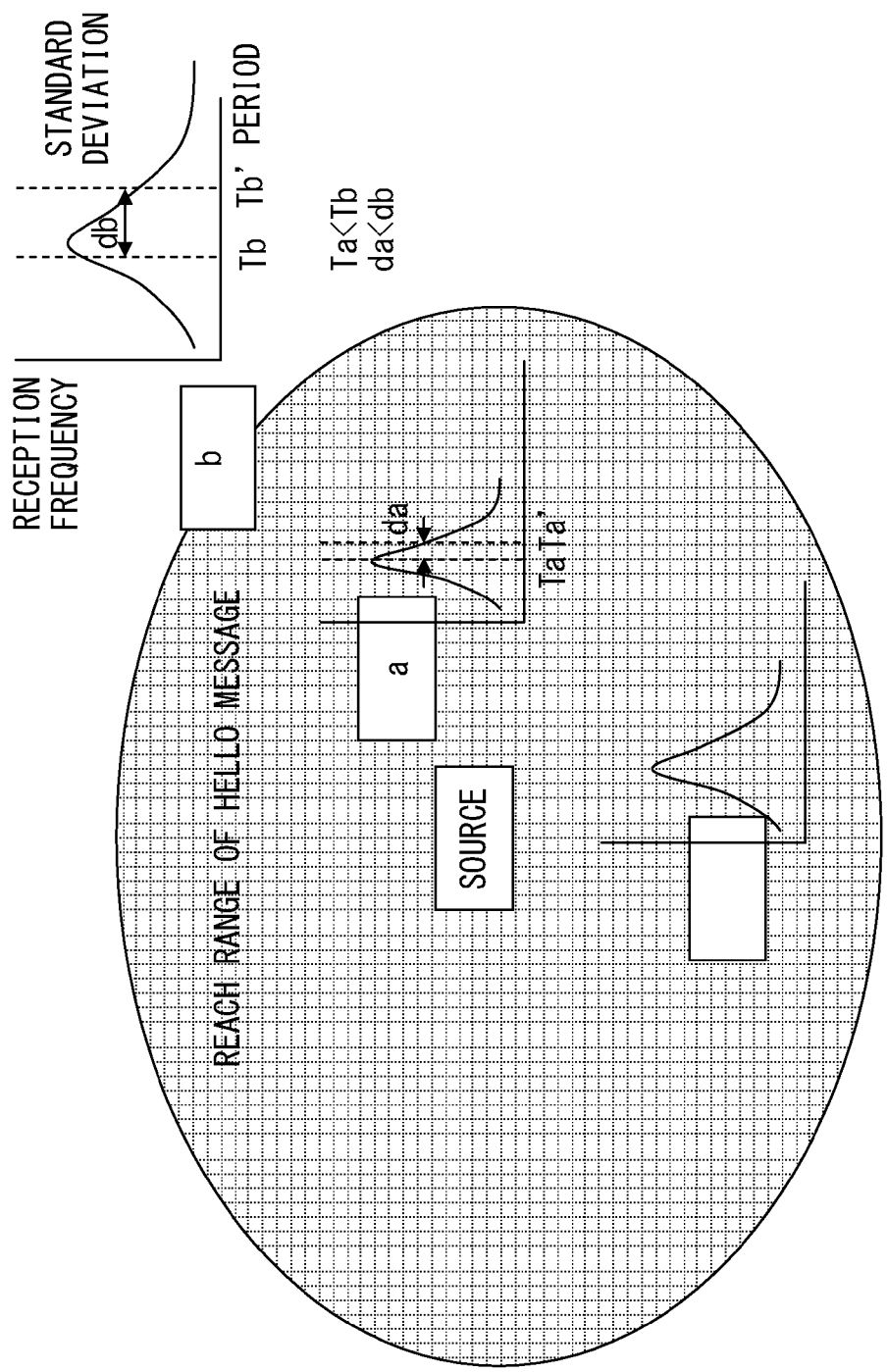
FIG. 13 is an explanatory view of the method of measuring the communication quality by a delay in the node device according to an embodiment of the present invention.

FIG. 13 is an explanatory view of the method of measuring the communication quality by a delay in the node device 1 or 1a according to the present embodiment. The "source" node device periodically transmits a hello frame to an external unit. The shaded part illustrated as an oval in FIG. 13 refers to a range in which the hello frame transmitted by the source node device can be received. The node devices a and b receive the hello frames sequentially transmitted from the source node device, and count the time required from the reception of one frame to the reception of the next frame. Hereinafter, the time required to receive the next frame is also referred to as a "reception period".

FIG. 13 is a graph (the vertical axis indicates the number of occurrences, and the horizontal axis indicates a reception period) indicating the relationship between the reception period of the node devices a and b and the reception frequency. As illustrated in FIG. 13, the relationship between the reception period and reception frequency in each node device generally refers to a normal distribution.

Generally, a frame loss easily occurs in the node device b whose distance from the source node device is relatively long. Therefore, in the node device b, a reception loss of a frame more easily occurs due to a frame loss than in the node device a, thereby lengthening the period to the reception of the next frame. Thus, in an embodiment of the present invention, the communication quality is obtained by the reception period T by performing the approximation in which a long reception period T is assumed to be a long delay.

The method of obtaining the communication quality by a reception period is described below. First, assume that a hello frame is received at a time t, and the next hello frame is received at a time t+$t_1$. In this case, the reception period T=$t_1$. It is assumed that a set of reception periods observed in a predetermined period is T $\{t_1, t_2, \ldots, t_1 | n \in N\}$ ($t_i$ (i=1, 2, ..., n) is an observation value at each time point). The standard deviation based on the observed reception period is expressed by the following equation (1). The $\bar{t}$ in the equation is an average value of the observation values of the reception period.

$$l = \sqrt{\frac{1}{n}\sum_{i=1}^{n} t_i^2 - (\bar{t})^2} \qquad (1)$$

The standard deviation obtained by the equation (1) above is stored in a predetermined field (not illustrated in the attached drawings) in the adjacent node management table 6 or 6a as an incoming route link weight. When the incoming route link weight obtained by the equation (1) is stored in a hello frame and transmitted to the communication partner node device, the partner node device acquires an outgoing route link weight from the received information. Thus, an incoming route link weight is obtained in the local node from the hello frame received from the partner node device, and the obtained incoming route link weight is stored in a hello frame and exchanged with the partner node device, thereby obtaining an outgoing route link weight.

When a bidirectional link weight is calculated from the obtained outgoing route link weight and incoming route link weight, various appropriate methods in the related technique field are available. For example, the bidirectional link weight can be calculated in the following equation (2).

(bidirectional link weight)=[{(outgoing route link weight)+1}{(incoming route link weight)+1}−1]$^{1/2}$ (2)

Figure 14:
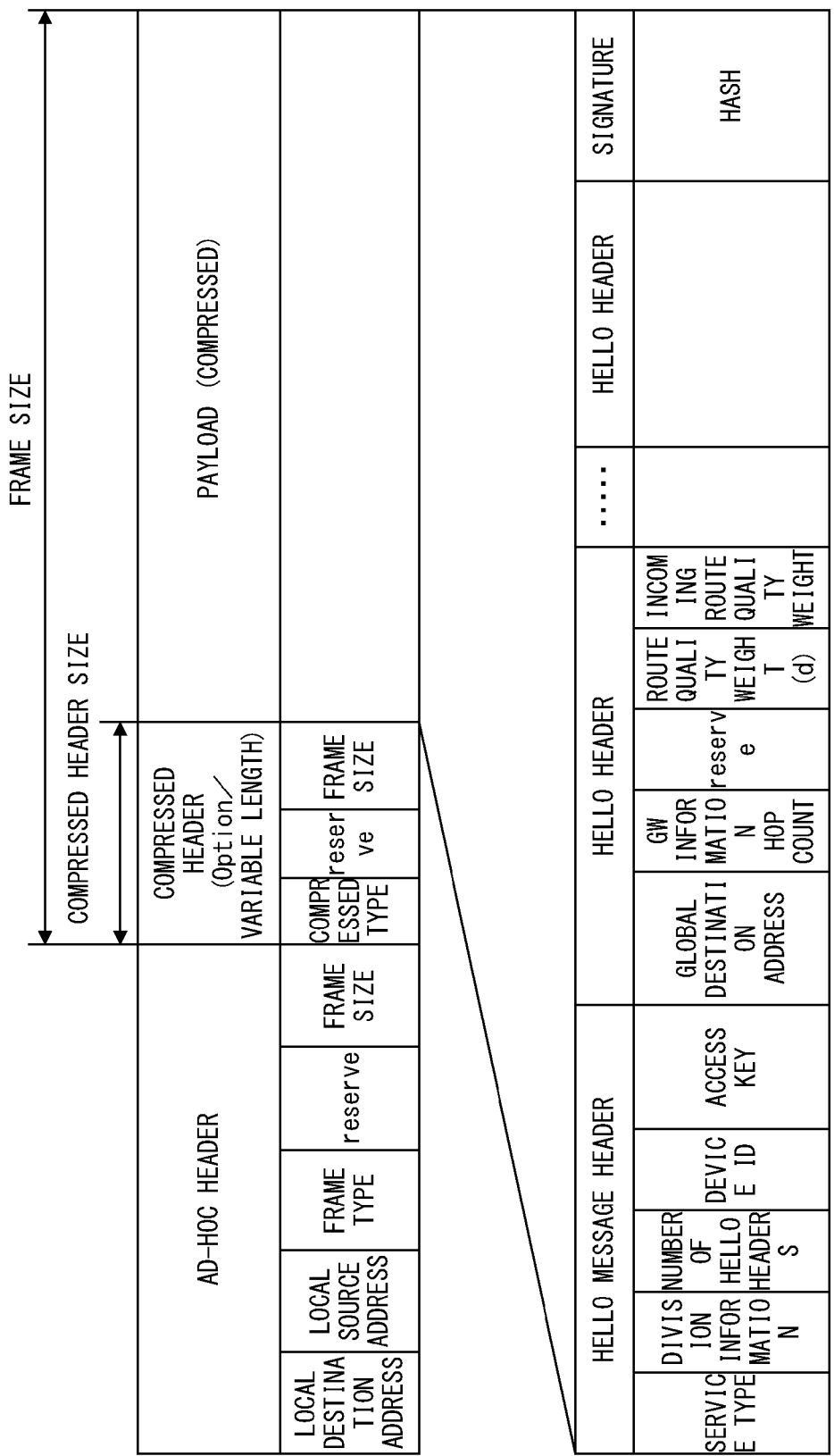
FIG. 14 illustrates the detailed format of the hello frame including a hello header.

FIG. 14 is a detailed explanatory view of the detailed format of the hello frame including a hello header. In another embodiment of the present invention, a different format can be used, and the other embodiment is included in the scope of the present invention.

The frame in FIG. 14 is roughly divided into an Ad-hoc header, a compressed header, and a payload.

In the present embodiment, the Ad-hoc header has fields of a "local destination address" (LD), a "local source address" (LS), a "frame type" indicating the type of frame, and a "frame size" indicating the size of a compressed frame.

A compressed header has fields of a "compression type" indicating the method of compressing a payload, and a "frame size" indicating the size of an uncompressed frame. Each node device can appropriately expand a payload by considering the compression type.

A payload also includes compressed data of a hello message header, one or more hello headers, and a hash indicating a signature. The compression in a frame according to the present embodiment is to attain the effect of saving the communication band by reducing the size of the frame. It is obvious that a frame having uncompressed data can be included in another embodiment of the present invention.

A hello message header included in a payload has fields of a "service type" indicating the type of service, "division information" indicating the dividing state in a payload, a "number of hello header" indicating the number of hello headers included in a payload, a "device ID" indicating the ID of a node device, and an "access key" for decoding encrypted information. The field of the "device ID" can store the ID of a node device as a source of a hello request described later as relating to the process in FIG. 22.

One or more hello headers included in a payload have fields of a "global source address" (GS), a "GW information hop count" indicating the hop count of the information about a gateway (GW), the above-mentioned "route quality weight" (d), and "incoming route quality weight".

The above-mentioned types of fields and their order are examples only. In other embodiments of the present invention, the above-mentioned fields and any other fields appropriate for those skilled in the art can be arranged in each header in an appropriate order.

FIG. 15 is a detailed explanatory view of the structure of the weighting table 7 or 7a. The weighting table 7 or 7a illustrated in FIG. 15 includes a global destination address (GD), a local destination address (LD), a hop count h, a inter-link reach weight w, a route quality weight d, and an evaluation value E. Although not illustrated in FIG. 15, the weighting table 7 or 7a can include other information. For example, it can include data of the latest update time indicating the information about the time when the data is updated. As described above, the weighting table is stored in each node device.

The global destination address (GD) stores the data in the field of the global destination address (GD) in the hello header of the received hello frame (in this example, it is to be interpreted as a hello frame received in any receiving process in a plurality of hello frame receiving processes described later with reference to 16 through 21 as performed after a node device is activated).

The local destination address (LD) stores the data indicated in the local source address (LS) included in the received hello frame. That is, when the node device which has received the hello frame is regarded as a subject, the LS of the received hello frame is a candidate for the LD when another frame is transmitted next.

The hop count h stores the hop count from the node device having the weighting table to the GD. That is, it stores the value obtained by adding 1 to the value indicated by the hop count in the hello header of the received hello frame.

The node type defines the type of node and stores the data indicated by the node type in the hello header of the received hello frame.

The inter-link reach weight w numerically expresses the possibility of the transfer of a data frame between links. In the embodiment, the data calculated based on the incoming route quality weight in the hello header of the received hello frame is stored as an inter-link reach weight w.

The route quality weight d is calculated based on the dispersion of the reception period of the hello frame as described above with reference to FIGS. 12 and 13.

The evaluation value E stores the total route evaluation information calculated using the hop count h, inter-link reach weight w, and the route quality weight d in the hello header of the received hello frame.

In this technical field, it is empirically known that the communication unstableness makes an exponential growth with an increasing hop count h (throughput is reduced). Therefore, for example, the evaluation value E can be expressed by the following equation (3).

$$E(h,w,e) = 2^{(h+w)} + d \qquad (3)$$

Nevertheless, in addition to the equation (3) above, a method of appropriately obtaining the evaluation value E can be used, and the method is included in the embodiments of the present invention. In other embodiments of the present invention, an evaluation value E can be calculated using at least one of the hop count h, the route quality weight d, the inter-link reach weight w, the received signal intensity, and any parameter considered appropriate in this technical field. For example, the evaluation value E can be calculated using the equation E=d+h+5w+20/r (where d indicates a route quality weight, h indicates a hop count, w indicates an inter-link reach weight, r indicates the intensity of a received signal (power) when the latest hello frame is received).

Furthermore, when the inter-link reach weight w is defined and the data transfer fails, the equation w=w+1 is used. If the data transfer is successfully performed, the equation w=w−1 (for example, 0 is the minimum value) is used. Then, using was in the equation (3) above, the adjacent node during the data transfer can be finely adjusted.

Thus, the node device 1 or 1a according to the present embodiment can monitor the state of the network based on the reception state of the hello frame from another node device.

FIGS. 16 through 21 are detailed flowcharts of the process of receiving a hello frame of the node device according to an embodiment of the present invention. The flow of the processes is described below with reference to the figures. The process performed by the node device according to the embodiment of the present invention is roughly described below.
(i) The adjacent node management table is updated in steps S1600 through S1614.
(ii) In steps S1700 through S1710', the evaluation value of the source (LS) of the hello frame registered in the weighting table of the local node device is updated for each GD of the hello header using the hello header of the hello frame.
(iii) In steps S1850 through S1700', the evaluation value of the weighting table of the local node device whose GD is the source (LS) of the hello frame is updated.
(iv) In steps S2000 through S2010', if the source (LS) of the hello frame has not been registered in the weighting table of the local node device, it is newly registered, and if the GD of the hello header has not been registered in the weighting table of the local node device, it is newly registered.

Figure 16:
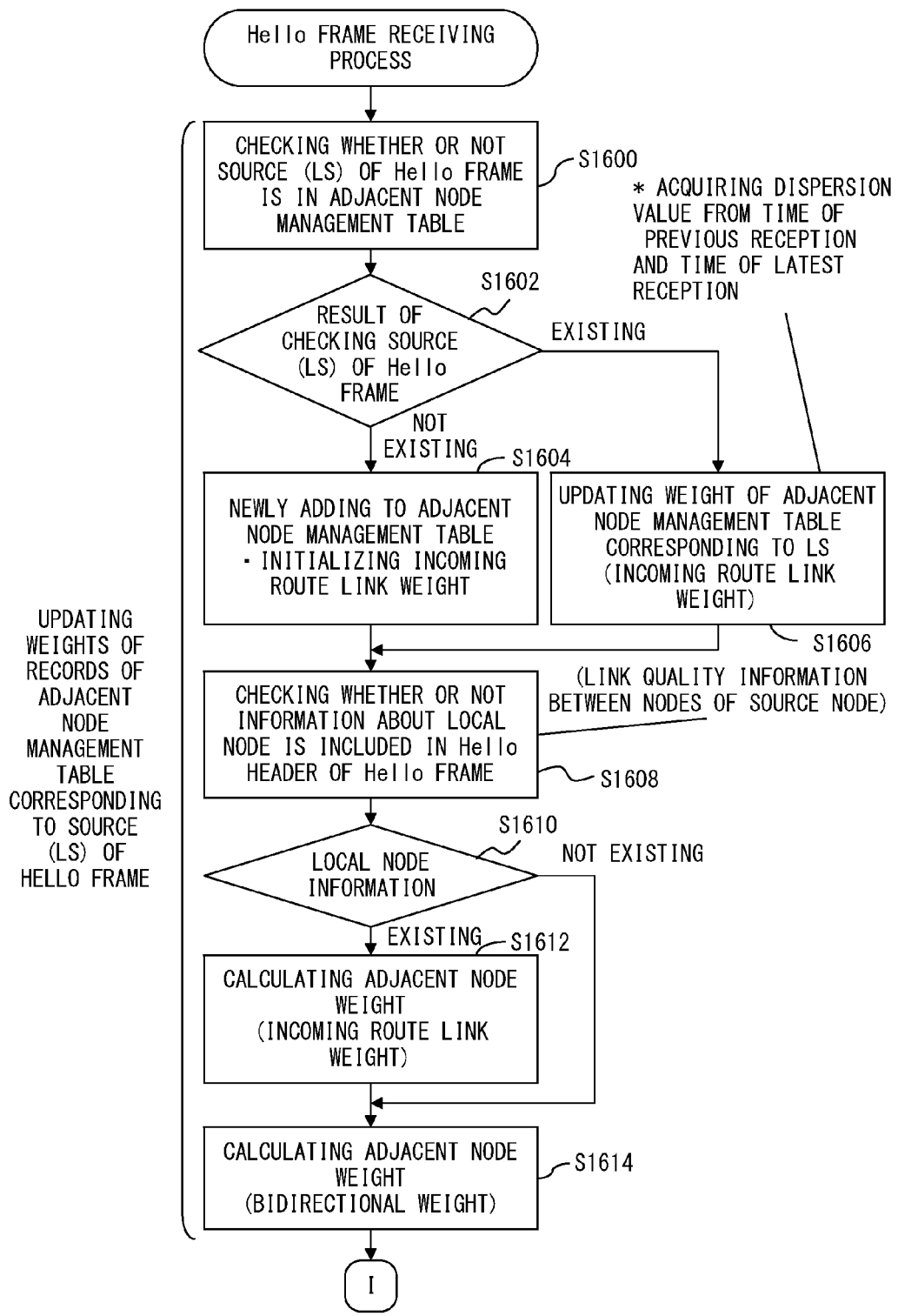
FIG. 16 is a detailed flowchart (1) of the process of receiving a frame of the node device according to an embodiment of the present invention.
Figure 18:
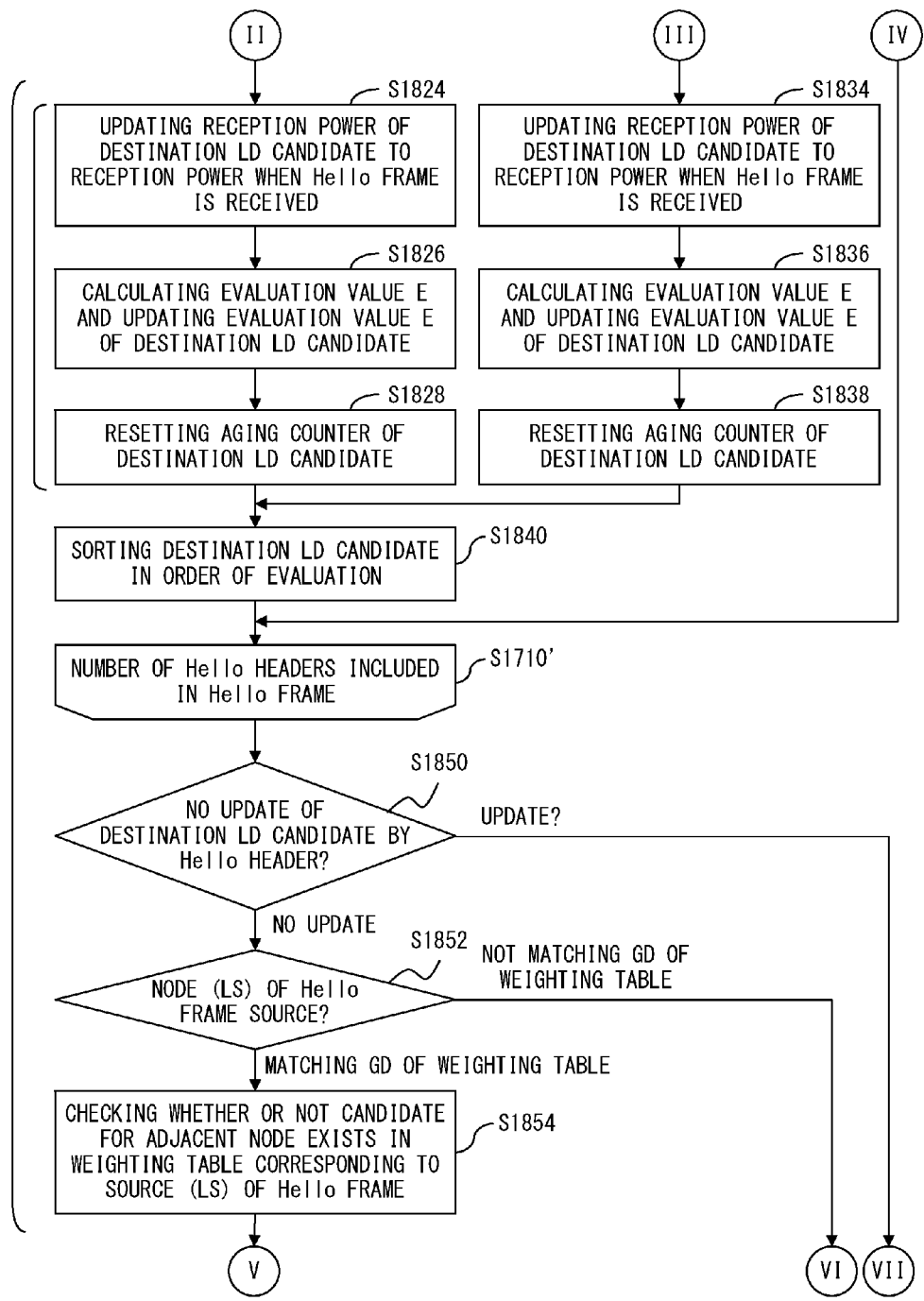
FIG. 18 is a detailed flowchart (3) of the process of receiving a frame of the node device according to an embodiment of the present invention.
Figure 21:
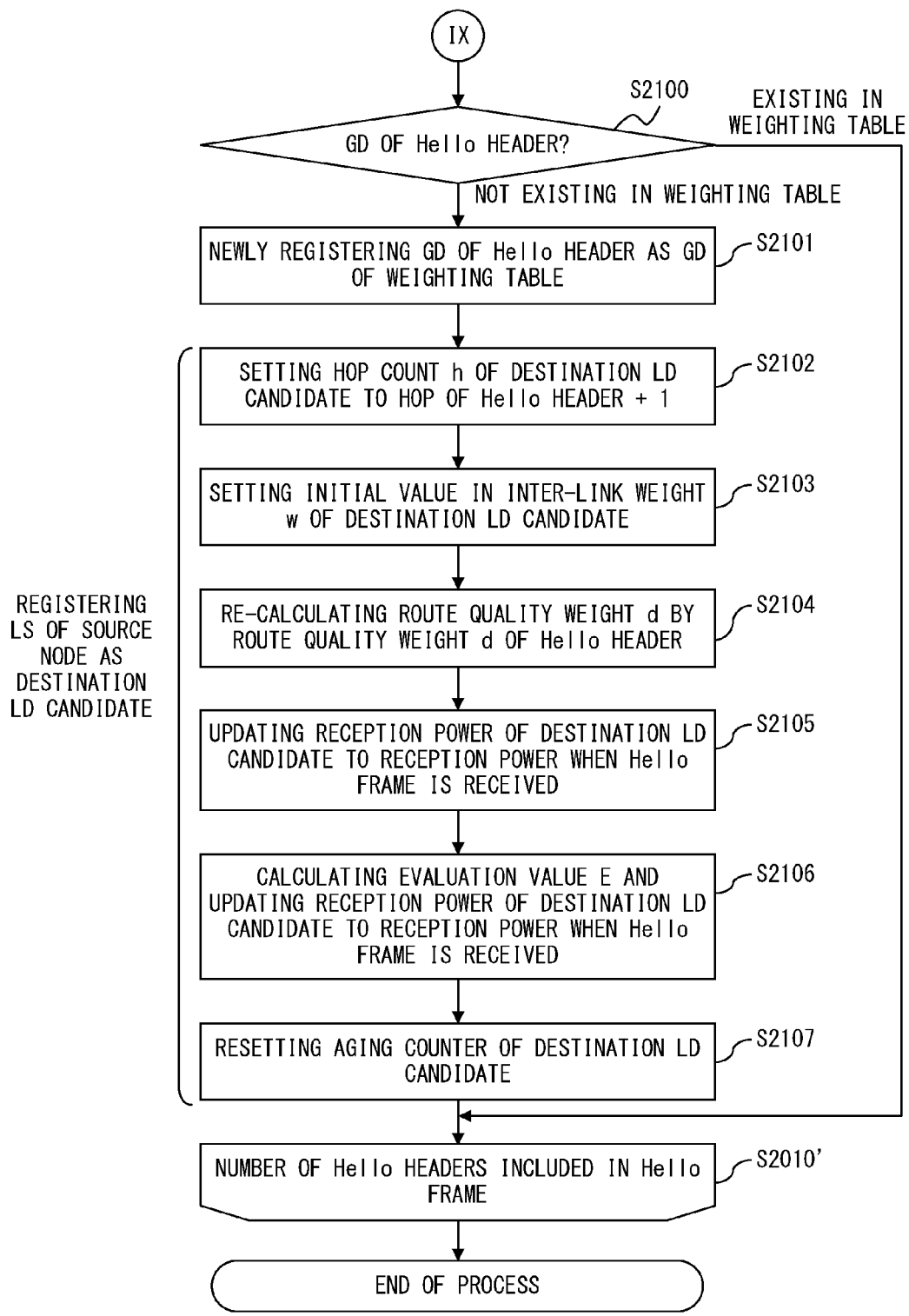
FIG. 21 is a detailed flowchart (6) of the process of receiving a frame of the node device according to an embodiment of the present invention.

The process flow in the present embodiment starts when a hello frame is received by a node device of a view point (local node device) in FIG. 16.

In steps S1600 through S1614, the information about the weight in the record of the adjacent node management table corresponding to the source (LS) of the hello frame is updated.

In according to S1600, the node device which has received the hello frame searches for a record corresponding to the source (LS) node device of the hello frame in the adjacent node management table of the node device. In the search, the reception time of the previous hello frame from the LS is compared with the reception time of the hello frame being processed. Thus, it is confirmed whether or not inconsistent reception time exists, and it is also determined whether or not a false LS exists (that is, a driven transmitted with a false LS).

In step S1602, if it is determined that there is no source (LS) of the hello frame detected in the adjacent node management table, then control is passed to step S1604. Then, an LS is newly added to the adjacent node management table, and an initial value of the incoming route link weight is set. In step S1602, if it is determined that there is a source (LS) of the hello frame detected in the adjacent node management table, and then control is passed to step S1606. Then, in the record corresponding to the lS in the adjacent node management table, the value of the incoming route link weight is updated.

In the subsequent step S1608, the information (ID etc.) about the local node device is searched for in the hello header of the hello frame. In this case, the link quality information between the nodes of the LS (that is, the incoming route link weight from the LS) is referred to. Then, if it is determined in step S1610 that there is the information about the local node device, control is passed to step S1612, and the outgoing route link weight about the adjacent node device is calculated.

In the subsequent step S1614, the bidirectional link weight of the adjacent node device is calculated. Then, control is passed to (I) in FIG. 17.

In step S1700 in FIG. 17, the iterative process (loop process) for each record of the weighting table of the local node device is started. Then, in step S1710, the iterative process for each hello header included in the hello frame is nested.

It is determined in step S1712 whether or not the GD of the weighting table matches the GD of the hello header (that is, included in the weighting table of the source (LS) in the hello frame).

If the GD of the weighting table does not match the GD of the hello header in step S1714, control is passed to (IV) in FIG. 17, one iterative cycle terminates in step S1710'. If the GD of the weighting table matches the GD of the hello header in step S1714, control is passed to step S1716.

In step S1716, an LD candidate as the destination to which the local node device is to transmit a frame is searched for in the weighting table corresponding to the source (LS) of the hello frame.

If the LD candidate (destination LD candidate) as a destination exists in step S1718, the hop count h is updated as the hop count+1 of the hello header in the record for the destination LD candidate in the weighting table in step S1720. In step S1722, the route quality weight d about the hello frame is calculated, and the route quality weight d about the destination LD candidate is updated. The route quality weight d about the hello frame can be obtained by, for example, performing addition or any arithmetic operation on the bidirectional link weight in the entire route (or at least a part of the entire route) calculated from the route quality weight viewed from the source of the hello frame and the incoming route quality weight of from the dispersion of the reception period of the hello frame. That is, in a node device, the route quality weight d about the received hello frame is added to the route quality weight d of the weighting table, and the obtained and updated route quality weight d is used as the route quality weight accommodated in the hello frame to be transmitted, thereby transmitting the weight to the next node device. In short, the accumulation of the bidirectional link weight for each hello header can be the route quality weight d of the weighting table. In the embodiment, each bidirectional link weight obtained during a series of iterative processes in S1710 through S1710' or the iterative processes in S1700 through S1700' are accumulated, thereby calculating the route quality weight d of the weighting table to be handled in the iterative processes. Then, control is passed to (II) in FIG. 18.

In step S1824, the reception power for the destination LD candidate (the field of the reception power is not illustrated in FIG. 15) is updated as the reception power when the hello frame is received. In step S1826, the evaluation value E about the hello frame is calculated as described above, and the evaluation value E about the destination LD candidate is updated. Then, in step S1828, the aging counter about the destination LD candidate (device for setting the expiration of the weighting table) is reset. Thus, control is passed to step S1840, the destination LD candidates are sorted in the order of the evaluation value, thereby narrowing preferable candidates on a priority basis. In step S1710', one iterative cycle is completed.

If no LD candidate as a destination cannot be detected in step S1718, the source (LS) of the hello frame is newly registered as an LD candidate as a destination in the weighting table, and control is passed to step S1730. In step S1730, the hop count h is updated as the hop count+1 of the hello header in the record about the new destination LD candidate. In step S1732, the route quality weight d about the hello frame is calculated, and the route quality weight d about the destination LD candidate is updated. Then, control is passed to (III) in FIG. 18. In step S1834, the reception power for the destination LD candidate is updated as the reception power when the hello frame is received. In step S1836, the evaluation value E about the hello frame is calculated as described above, and the evaluation value E about the destination LD candidate is updated. In step S1838, the aging counter about the destination LD candidate is reset. Then, control is passed to step S1840, the destination LD candidates are sorted in the order of the evaluation value, thereby completing the iterative cycle in step S1710'.

When the iterative processes in steps S1710 through S1710' are completed, control is passed to step S1850.

In step S1850, it is confirmed whether or not a destination LD candidate has been updated using the hello header in the process in the iterative processes in steps S1700 through S1710', that is, whether or not control has been passed to steps S1714 through S1716. If the update has been performed, control is passed to (VII) in FIG. 19, and the iterative cycle is terminated in step S1700'. If the update has not been performed, control is passed to step S1852. In step S1852, it is determined whether or not the value of the node device (LS) as the source of the hello frame corresponds to the GD of the weighting table (as illustrated in FIG. 15). In the embodiment, the routing is evaluated.

If the node device (LS) as the source of the hello frame does not match the GD of the weighting table, control is passed to (VI) in FIG. 19, and the destination LD candidates are sorted in the order of evaluation value in step S1930. In step S1700', one iterative cycle is terminated.

When the node device (LS) as the source of the hello frame matches the GD of the weighting table, control is passed to step S1854. Then, a candidate for an adjacent node is searched for in the weighting table corresponding to the source (LS) of the hello frame. Then, in step S1900 beyond (V) in FIG. 19, when there is a destination LD candidate, control is passed to step S1910. In step S1910, the route quality weight d about the hello frame is calculated, and the route quality weight d about the destination LD candidate is updated. In step S1912, the reception power about the destination LD candidate is updated as the reception power when the hello frame is received. In step S1914, the evaluation value E about the hello frame is calculated as described above, and the evaluation value E about the destination LD candidate is updated. then, in step S1916, the aging counter about the destination LD candidate is reset. Although omitted due to the condition of the width of the form, when there are a plurality of destination LD candidates, the processes in steps S1910 through S1916 can be repeated for each of them. Then, control is passed to step S1930, the destination LD candidate is sorted in the order of evaluation value, and one iterative cycle is completed in step S1700'.

On the other hand, in step S1900, when there is no destination LD candidate, control is passed to step S1920. In step S1920, the hop count of a new destination LD candidate is set as the initial value (1 in this example). In step S1922, the initial value (for example, 0.5) is set as the inter-link reach weight w of the destination LD candidate. In step S1924, the route quality weight d about the hello frame is calculated, and the route quality weight d about the destination LD candidate is updated. In step S1926, the reception power about the destination LD candidate is updated as the reception power when the hello frame is received. In step S1928, the evaluation value E about the hello frame is calculated as described above, and the evaluation value E about the destination LD candidate is updated. Then, in step S1929, the aging counter about the destination LD candidate is reset. Then, control is passed to step S1930, the destination LD candidates are sorted in the order of the evaluation value, and one iterative cycle is completed in step S1700'.

When the iterative processes S1700 through S1700' are completed for one cycle, control is passed to step S2000 in FIG. 20 beyond (VIII).

In step S2000, it is confirmed whether or not the entry corresponding to the node device (LS) (whose LS is the GD) as the source of the hello frame exists in the weighting table (group) of the local node device. When the weighting table includes the entry, control is passed to step S2010. If the entry is not included in the weighting table, control is passed to step S2001.

In step S2001, a new weighting table having the LS as the GD is generated. In step S2002, the hop count of the new destination LD candidate is set as the initial value (1 in this example). In step S2003, the initial value (for example, 0.5) is set as the inter-link reach weight w of the destination LD candidate. In step S2004, the route quality weight d about the hello frame is calculated, and the route quality weight d about the destination LD candidate is updated. In step S2005, the reception power about the destination LD candidate is updated as the reception power when the hello frame is received. In step S2006, the evaluation value E about the hello frame is calculated as described above, and the evaluation value E about the destination LD candidate is updated. Then, in step S2007, the aging counter about the destination LD candidate is reset. Control is passed to step S2010.

In step S2010, an iterative processes is started for each hello header included in a hello frame.

In step S2100 beyond (IX), it is confirmed whether or not the GD of the hello header exists in the weighting table of the local node device. When the entry exists in the weighting table, control is passed to step S2010', and one iterative cycle is completed. If no corresponding entry exists in the weighting table, control is passed to step S2101.

In step S2101, a new weighting table corresponding to the GD of the hello header is generated, and an entry having the LS of the Ad-hoc header of the hello frame as the value of the field LD is generated. In step S2102, the hop count h of a new destination LD candidate is set as the hop count+1 of the hello header. In step S2103, the initial value (for example, 0.5) is set as the inter-link reach weight w of the destination LD candidate. In step S2104, the route quality d is recalculated using the route quality weight d about the hello header, and the route quality weight d about the destination LD candidate is initialized. In step S2105, the reception power about the destination LD candidate is updated as the reception power when the hello frame is received. In step S2106, the evaluation value E about the hello header is calculated, and the evaluation value E about the destination LD candidate is updated. In step S2107, the aging counter about the destination LD candidate is reset. Then, control is passed to step S2010', and one iterative cycle is completed.

When one cycle of the iterative processes S2010 through S2010' is completed, the series of the processes terminates.

Figure 22:
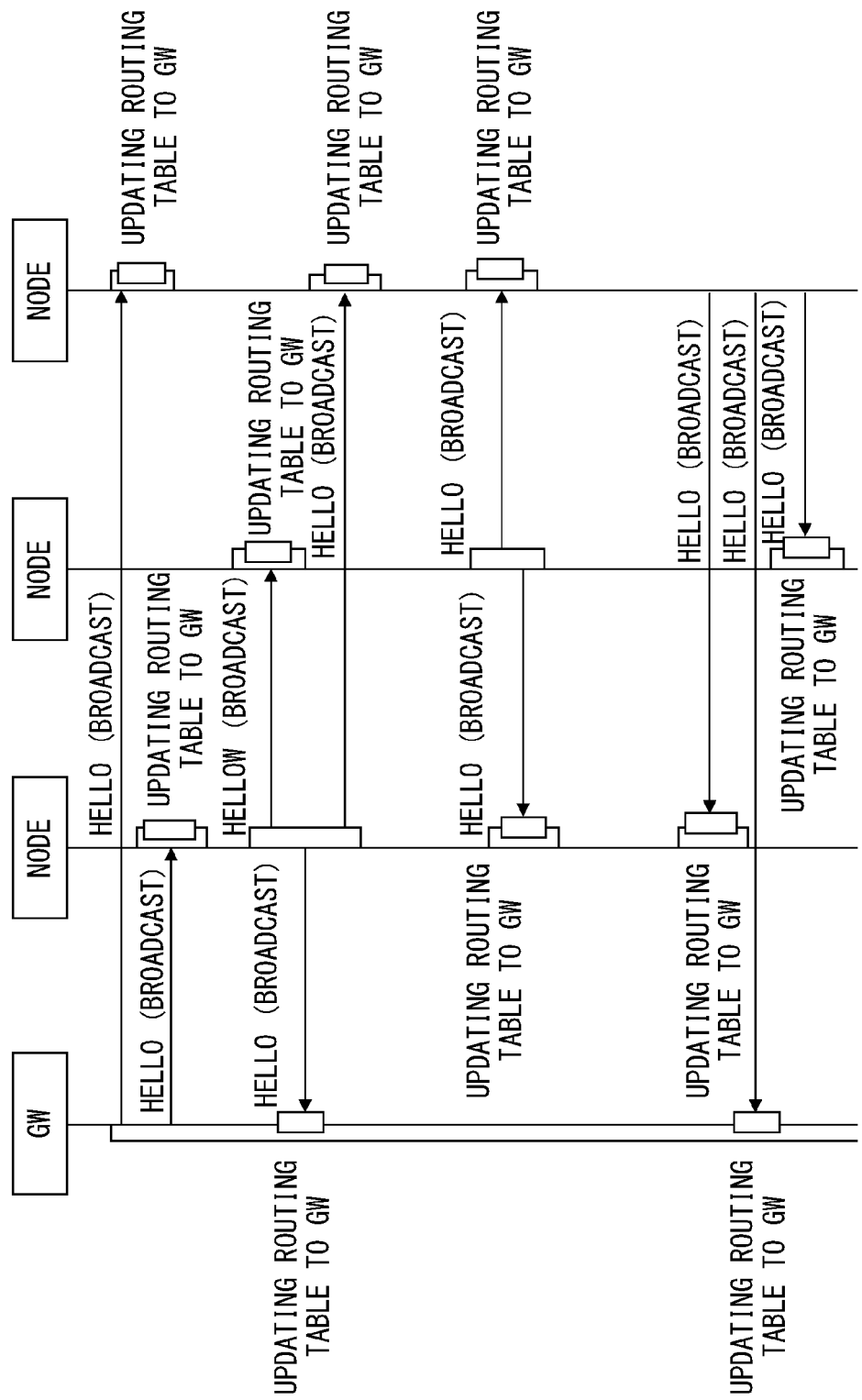
FIG. 22 illustrates the sequence of exchanging a hello frame.

FIG. 22 illustrates the sequence of exchanging a hello frame. Each node device broadcasts a hello frame to a neighboring node device. The hello frame includes link information considered the optimum in the route to each node. Upon receipt of the hello frame, each node device compares it with the adjacent node management table 6 of 6a and the weighting table 7 or 7a, and generates or updates the information about the weight of each node. In addition, the link information about the hello frame is updated with reference to the adjacent node management table 6 or 6a is referred to. By each node device repeating the operation several times, the node device can obtain plural pieces of link destination information for enabling each routing to another node device.

In an embodiment, when the node device 1 or 1a cannot receive within a predetermined period (for example, within 30 minutes) a hello frame which has been received from a specific node device, it assumes that the specific node device is in a state in which no communications can be established, and notifies a gateway device of the information. Then, after making a determination from the contents of the received hello frame, the gateway device can be informed of an abnormal condition if it is detected. Furthermore, when an abnormal condition is detected in a node device by referring to the adjacent node management table 6 or 6a, the priority of the node device can be reduced by updating the weight corresponding to the weighting table 7 or 7a.

Furthermore, in an embodiment, as illustrated in FIG. 22, the active/inactive state of a gateway device can be monitored by transmitting and receiving a hello frame to and from the gateway device.

In monitoring the state between node devices, when no hello frame is received from a partner node device within a predetermined time, a hello frame generate request is transmitted to the partner node device and the state of the partner node device is monitored depending on whether or not a hello frame is received from the partner node device.

In an embodiment, a network is monitored in each node device as described above, the information about a node device on the route through which a hello frame has passed is added to the hello frame, and a sum is calculated by a server, thereby monitoring the network.

Depending on the embodiments of the present invention, each node device monitors a network using a hello frame. Thus, it is not necessary to separately transmit a frame for monitoring the network, and reduce the number of transmitted frames. In addition, by monitoring the network using a hello frame transmitted and received to and from an adjacent node, a monitoring operation nearly in real time can be performed with a smaller turnaround as compared with the case in which a network monitoring frame is transmitted from central equipment and the state is monitored depending on a result of the transmission.

FIG. 23 is the outline of the hardware capable of operating a node device or executing a program according to an embodiment of the present invention.

FIG. 23 first illustrates a microprocessor unit (MPU) 2300 for performing various calculating processes. The microprocessor unit 2300 is connected to establish communications through a cable physical processing unit (PHY) 2312 and an MII (media independent interface)/MDIO (management data input/output) interface 2310 ("MII/MDIO" refers to "MII or MDIO"). The MII and the MDIO are interfaces between a physical layer and a MAC sublayer (media access control sublayer). The microprocessor unit 2300 is also connected to establish communications through a timer IC 2322 for measuring timer and an I²C (inter-integrated circuit)/PIO (parallel input/output) bus 2320 ("I²C/PIO" refers to "I²C or PIO"). Furthermore, the microprocessor 2300 is connected to communicate with dynamic random access memory (DRAM) 2332 and flash memory 2334 as storage devices and a wireless LAN processing unit 2336 as a network interface through a PCI (peripheral component interconnect) bus 2330. It is obvious that devices other than those of different types and standards illustrated here can be appropriately used in light of the common knowledge of the prior art.

The MPU 2300 can perform various processes by loading various programs such as firmware stored in the flash memory 2334 as a non-volatile memory device into the DRAM 2332 and executing the programs. The MPU 2300 can execute various programs such as a firmware program for directing the node device 1 to perform, for example, the above-mentioned processes.

The DRAM 2332 can also be used as a transmission buffer and a reception buffer for frames. The flash memory 2334 can store a firmware programs etc. as described above. In addition, the flash memory 2334 can store specific information (for example, a node ID and a MAC address) in the node device 1 or 1a.

The cable PHY processing unit 2312 is a circuit for processing a physical layer in a wired connection. The wireless LAN processing unit 2336 is hardware for processing a physical layer in a wireless LAN connection. The wireless LAN processing unit 2336 can include, for example, an antenna, an ADC (analog-to-digital converter), a DAC (digital-to-analog converter), a modulator, a demodulator, etc., and process a physical layer and a MAC sublayer. Therefore, the node device 1 or 1a can perform both wired and wireless communications in the present embodiment. It is obvious that the node device 1 and 1a can perform only one of wired and wireless communications.

The timer IC 2322 is a circuit for counting the lapse of set time and outputting an interruption signal if the set time has passed.

The node devices are mainly described with respect to the above-mentioned embodiment, but a control program for directing a computer to execute the above-mentioned method is also included as an example of an embodiment of the present invention. The control program is provided after stored in a computer-readable storage medium such as a magnetic disk, a magneto-optical disk, non-volatile semiconductor memory, an optical disk, etc., loaded into a computer, and executed by the computer.

The computer for executing the control program is built in or connected to a node device not illustrated in the attached drawings, and controls a node not illustrated in the attached drawings according to the control program so that the node device not illustrated in the attached drawings can operate similarly with the node device 1 or 1a. For example, from another viewpoint of the embodiment, it can be assumed that the MPU 2300 as a built-in computer of the node device 1 or 1a controls the node device 1 or 1a according to the control program stored in the flash memory 2334, directs the node device 1 or 1a to perform each process.

As described above, according to the node device of the embodiment, although the device is applied to a large communication network, each node device can optimize a route according to the information received from an adjacent node device, and monitor the network.

In addition, according to the present embodiment, various data in a table format is disclosed for comprehensibility. However, the present invention is not limited to this example, and can use other management formats such as an XML, a tree structure, etc. in which associated data can be managed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node device in a network having a plurality of node devices, the node device comprising:
    an identification information management table configured to store, as information about a frame transmitted by a local node, identification information for unique identification of a frame and information about a destination node of the frame;
    a destination node weighting table configured to store weighting information about another node as a destination node for relay of the frame for each final destination node of the frame;
    a frame reception device configured to receive the frame transmitted addressed to the local node from another node;
    a destination node weighting table update device configured to update data of the destination node weighting table corresponding to the final destination node of the frame for the destination node stored as associated with identification information when an occurrence of a loop or a back-track is detected by comparing the identification information of the frame received by the frame reception device with the identification information stored in the identification information management table; and
    a frame destination determination device configured to determine another node as a destination node for relay of the frame by referring to the destination node weighting table corresponding to a final destination node of the frame when he identification information about the frame received by the frame reception device is not stored in the identification information management table,
    wherein the weighting information includes one of an incoming route link weight, an outgoing route link weight, a bidirectional link weight, an incoming route quality weight and an inter-link reach weight.

2. The node device according to claim 1, wherein when the occurrence of a loop or a back-track is detected by comparing the identification information of the frame received by the frame reception device with the identification information stored in the identification information management table, the destination node weighting table update device updates the destination node stored as associated with the identification information so that a weight of the destination node of the destination node weighting table corresponding to a final destination node of the frame can be reduced in priority.

3. The node device according to claim 2,
    further comprising:
    an adjacent node management table configured to store information about nodes surrounding a local node;
    a hello message transmission device configured to transmit information about existence of the local node and information about surrounding routes read from the adjacent node management table as a hello message;
    a hello message reception device configured to receive the hello message transmitted from the surrounding node; and
    an adjacent node management table update device configured to update the adjacent node management table according to information about a source node of the hello message received from the hello message reception device,
    wherein the destination node weighting table update device updates, in the adjacent node management table, data to be transmitted to a first node of the destination node weighting table so that a priority of the data can be reduced when the first node in a predetermined state is detected.

4. The node device according to claim 3, wherein the adjacent node management table update device updates the adjacent node management table depending on a state of a source node determined based on a reception interval of a hello message of each source node received by the hello message reception device.

5. A method executed by a node device in a network having a plurality of node devices, said method comprising:
    storing in an identification information management table, as information about a frame transmitted by a local node, identification information for unique identification of a frame and information about a destination node of the frame;
    storing in a destination node weighting table storing weighting information about another node as a destination node for relay of the frame for each final destination node of the frame;
    receiving the frame transmitted addressed to the local node from another node;
    updating data of the destination node weighting table corresponding to the final destination node of the frame for the destination node stored as associated with identification information when an occurrence of a loop or a back-track is detected by comparing the identification information of the frame received by the frame reception device with the identification information stored in the identification information management table; and
    determining another node as a destination node for relay of the frame by referring to the destination node weighting table corresponding to a final destination node of the frame when the identification information about the received frame is not stored in the identification information management table,
    wherein the weighting information includes one of an incoming route link weight, an outgoing route link weight, a bidirectional link weight, an incoming route quality weight and an inter-link reach weight.

6. The method according to claim 5, wherein when the occurrence of a loop or a back-track is detected by comparing the identification information of the frame received by the frame reception device with the identification information stored in the identification information management table, the destination node weighting table updating process updates the destination node stored as associated with the identification information so that a weight of the destination node of the destination node weighting table corresponding to a final destination node of the frame can be reduced in priority.

7. The method according to claim 6, further comprising:
    receiving as a hello message information about an existence of another node transmitted from the other node and information about a route around the other node;
    updating an adjacent node management table storing information about another node around the local node according to information about a source node of the received hello message;

the destination node weighting table updating process updating data which is the first node as a destination node of the destination node weighting table so that a priority of the data can be reduced when a first node entering a predetermined state is detected in the adjacent node management table.

8. The method according to claim 7, wherein the adjacent node management table updating process performs update based on a state of the source node determined depending on a reception interval for each source node of the hello message.

9. A non-transitory computer readable storage medium storing a program making a computer as a node device in a network having a plurality of node devices to execute a process comprising:
storing in an identification information management table, as information about a frame transmitted by a local node, identification information for unique identification of a frame and information about a destination node of the frame;
storing weighting information about another node as a destination node for relay of a frame for each final destination node of the frame in a destination node weighting table;
receiving the frame transmitted addressed to the local node from another node;
updating data of the destination node weighting table corresponding to the final destination node of the frame for the destination node stored as associated with identification information when an occurrence of a loop or a back-track is detected by comparing the identification information of the frame received by the frame reception device with the identification information stored in the identification information management table; and
determining another node as a destination for relay of the frame by referring to the destination node weighting table corresponding to a final destination node of the frame when the received identification information about the frame is not stored in the identification information management table,
wherein the weighting information includes one of an incoming route link weight, an outgoing route link weight, a bidirectional link weight, an incoming route quality weight and an inter-link reach weight.

10. A node device in a network including a plurality of node devices, comprising:
a frame reception device configured to receive a frame transmitted addressed to a local node from one or more partner nodes;
a storage device configured to store a table including:
first information about communication quality of a frame transmitted from the local node to each of the one or more partner nodes;
second information about communication quality of a frame transmitted from each of the one or more partner nodes to the local node; and
third information about bidirectional communication quality calculated from the first and second information;
a priority determination device configured to determine an evaluation value indicating a priority of each of the one or more partner nodes according to the table; and
a frame transmission device configured to transmit according to the evaluation value a frame to a node having a highest priority in the one or more partner nodes,
wherein the evaluation value is calculation using a hop count, an inter-link reach weight and a route quality weight in the frame received by the frame reception device.

11. The node device according to claim 10, wherein
the priority determination device determines the evaluation value according to the hello frame received by the frame reception device and transmitted from one or more of the partner nodes to the local node;
the frame reception device receives a data frame transmitted to the local node from any of the one or more of the partner nodes; and
the frame transmission device transmits the data frame to an appropriate node in the one or more of the partner nodes using the evaluation value.

12. A method executed by a node device in a network having a plurality of node devices, said method comprising:
receiving a frame transmitted addressed to a local node from one or more partner nodes;
storing in a storage device a table including:
first information about communication quality of a frame transmitted from the local node to each of the one or more partner nodes;
second information about communication quality of a frame transmitted from each of the one or more partner nodes to the local node; and
third information about bidirectional communication quality calculated from the first and second information;
determining an evaluation value indicating a priority of each of the one or more partner nodes according to the table stored in the storage device; and
transmitting according to the evaluation value a frame to a node having a highest priority in the one or more partner nodes,
wherein the evaluation value is calculated using a hop count, an inter-link reach weight and a route quality weight in the received frame.

13. The method according to claim 12, further comprising:
determining the evaluation value according to a received hello frame transmitted from one or more of the partner nodes to the local node;
receiving a data frame transmitted to the local node from any of the one or more of the partner nodes; and
transmitting the data frame to an appropriate node in the one or more of the partner nodes using the evaluation value.

14. A non-transitory computer readable storage medium storing a program making a computer as a node device in a network having a plurality of node devices to execute a process, said process comprising:
receiving a frame transmitted addressed to a local node from one or more partner nodes;
storing in a storage device a table including:
first information about communication quality of a frame transmitted from the local node to each of the one or more partner nodes;
second information about communication quality of a frame transmitted from each of the one or more partner nodes to the local node; and
third information about bidirectional communication quality calculated from the first and second information;
determining an evaluation value indicating a priority of each of the one or more partner nodes according to the table stored in the storage device; and transmitting according to the evaluation value a frame to a node having a highest priority in the one or more partner nodes,
wherein the evaluation value is calculated using a hop count, an inter-link reach weight and a route quality weight in the received frame.

* * * * *